United States Patent
Valdez et al.

(10) Patent No.: US 10,837,177 B2
(45) Date of Patent: Nov. 17, 2020

(54) CHECK VALVE FOR DOWNSPOUTS

(71) Applicant: FREE FLOW PRODUCTS, LLC, Oceanside, CA (US)

(72) Inventors: William T. Valdez, Oceanside, CA (US); Timothy J. Morrison, Oceanside, CA (US)

(*) Notice: Subject to any disclaimer, the term of this patent is extended or adjusted under 35 U.S.C. 154(b) by 0 days.

(21) Appl. No.: 15/652,071

(22) Filed: Jul. 17, 2017

(65) Prior Publication Data

US 2018/0016792 A1 Jan. 18, 2018

Related U.S. Application Data

(63) Continuation of application No. 62/363,101, filed on Jul. 15, 2016.

(51) Int. Cl.

| | |
|---|---|
| *E04D 13/08* | (2006.01) |
| *E03F 7/06* | (2006.01) |
| *A01M 29/30* | (2011.01) |
| *F16K 15/03* | (2006.01) |
| *F16L 37/02* | (2006.01) |
| *F16K 31/12* | (2006.01) |
| *F16L 55/24* | (2006.01) |

(52) U.S. Cl.
CPC ............ *E04D 13/08* (2013.01); *A01M 29/30* (2013.01); *E03F 7/06* (2013.01); *F16K 15/033* (2013.01); *F16K 31/12* (2013.01); *F16L 37/02* (2013.01); *E04D 2013/0806* (2013.01); *F16L 55/24* (2013.01)

(58) Field of Classification Search
CPC . E04D 13/08; E04D 2013/0806; F16K 31/12; F16K 15/033; F16L 37/02; F16L 55/24; Y10T 137/7902; A01M 29/30; E03F 7/06
See application file for complete search history.

(56) References Cited

U.S. PATENT DOCUMENTS

| | | | |
|---|---|---|---|
| 1,000,719 A | | 8/1911 | Cram |
| 4,867,802 A | | 9/1989 | Earl |
| 5,004,010 A | * | 4/1991 | Huet ...................... F16K 17/28 |
| | | | 137/513.3 |
| 5,397,314 A | * | 3/1995 | Farley ................ A61B 17/3498 |
| | | | 137/527.6 |

(Continued)

OTHER PUBLICATIONS

WO, PCT/US2017/042449 ISR and Written Opinion, dated Oct. 19, 2017.

*Primary Examiner* — Michael R Reid
*Assistant Examiner* — Patrick C Williams

(57) ABSTRACT

Methods, systems and devices for a check valve for deterring intrusion into downspouts include a body member having at least a first orifice and are configured to mount on a downspout, where the downspout is adapted to promote fluid flow in a single direction. Pivotably mounted on the body members are various valve members. The mounting arrangement can provide a closed position that substantially occludes the first orifice and a range of open positions when the valve member is pivoted with respect to the body member to open in the flow direction. In addition, at least one additional orifice can be provided in either the body member or the valve member to permit fluid flow irrespective of the position of the valve member.

12 Claims, 27 Drawing Sheets

(56) References Cited

U.S. PATENT DOCUMENTS

| | | | | |
|---|---|---|---|---|
| 6,240,957 B1 * | 6/2001 | Hattori | ................... | B60K 15/04 |
| | | | | 137/515 |
| 6,709,021 B2 * | 3/2004 | Duncan | ................... | F16L 33/04 |
| | | | | 285/109 |
| 8,006,720 B1 * | 8/2011 | Kotansky | ................ | E04D 13/08 |
| | | | | 137/873 |
| 8,459,298 B1 | 6/2013 | Valdez et al. | | |
| 8,656,947 B1 * | 2/2014 | Barton | ................... | E04D 13/08 |
| | | | | 137/544 |
| 2007/0012365 A1 * | 1/2007 | Kishi | ................... | F16K 15/033 |
| | | | | 137/527 |

* cited by examiner

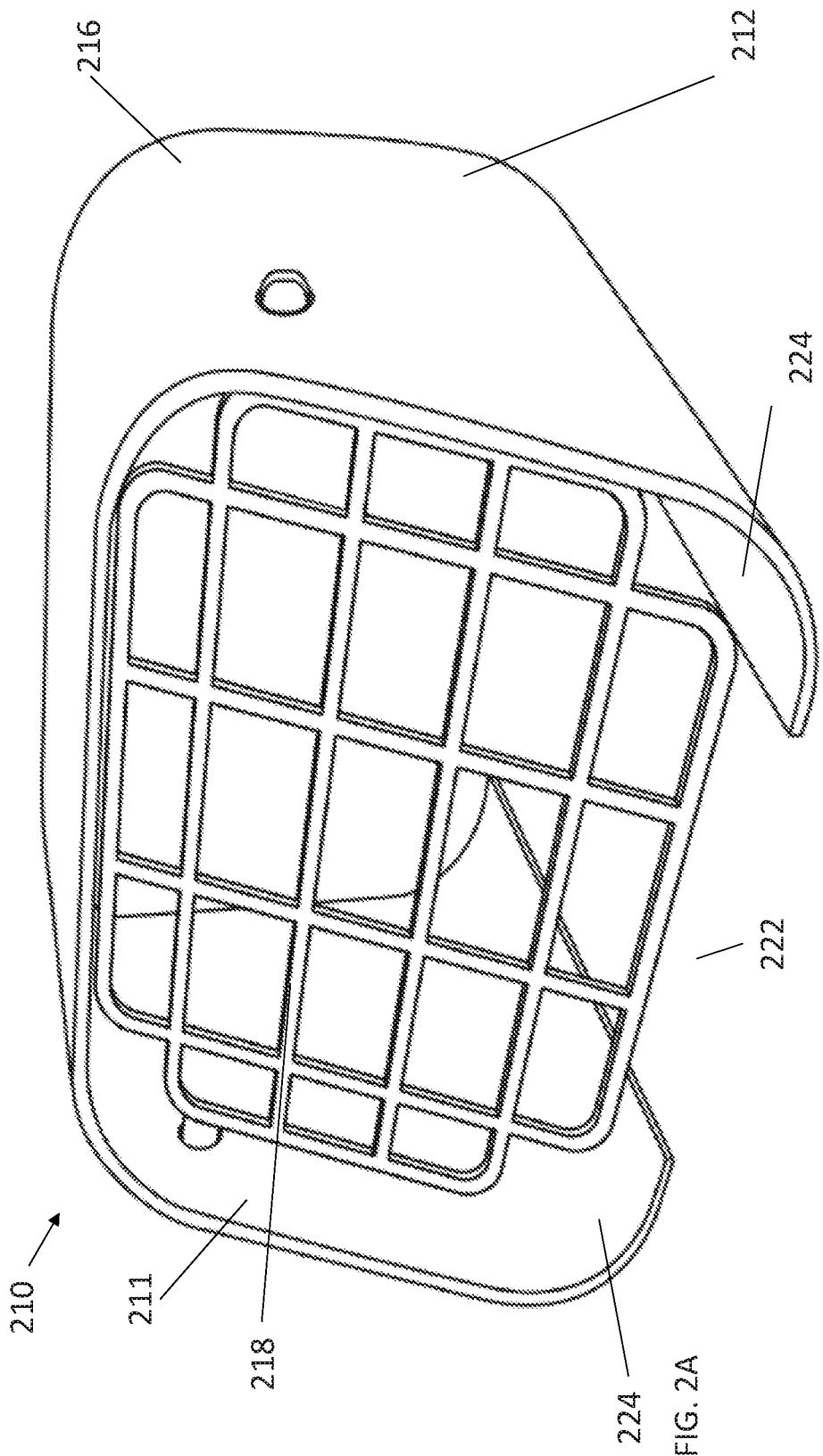

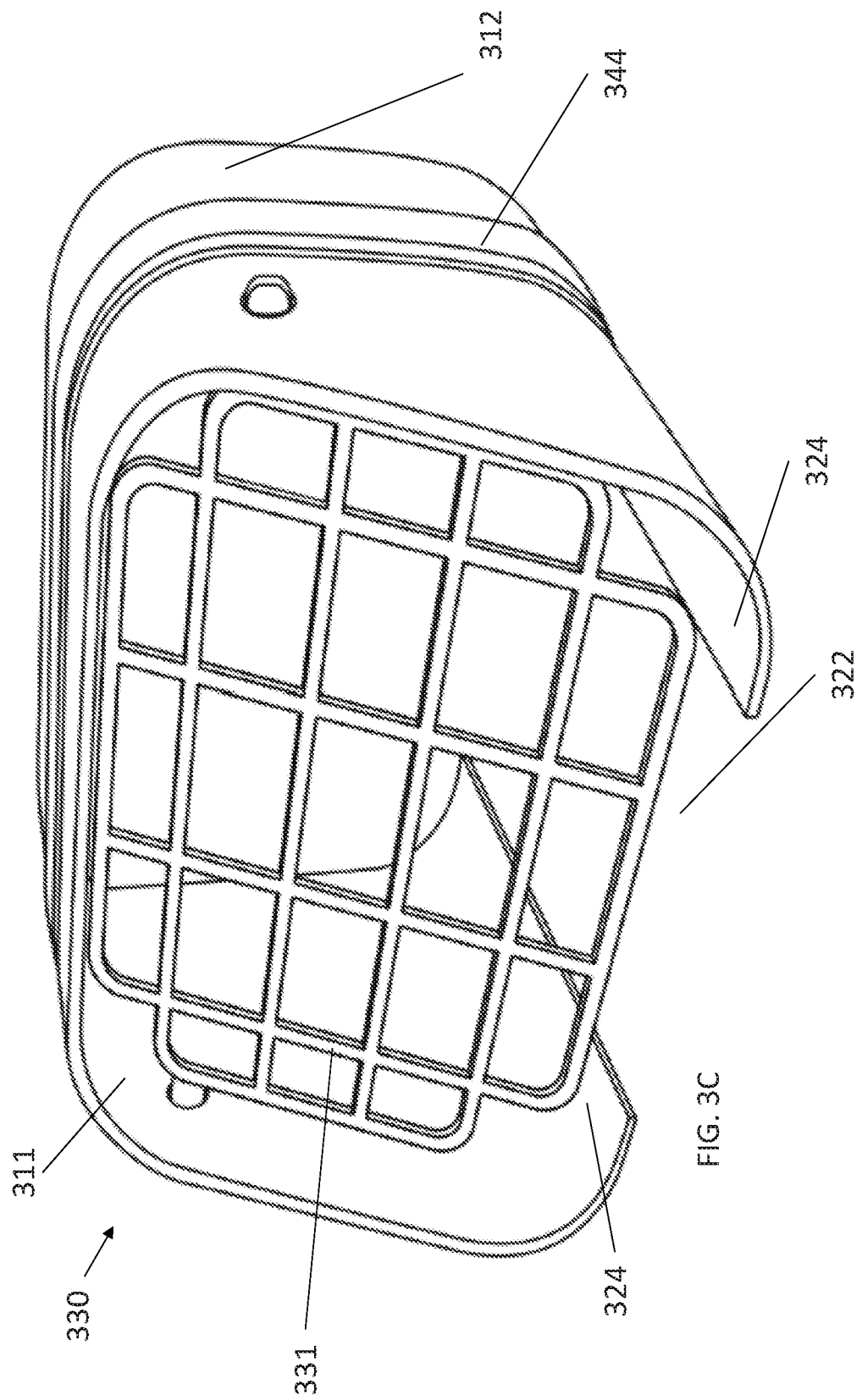

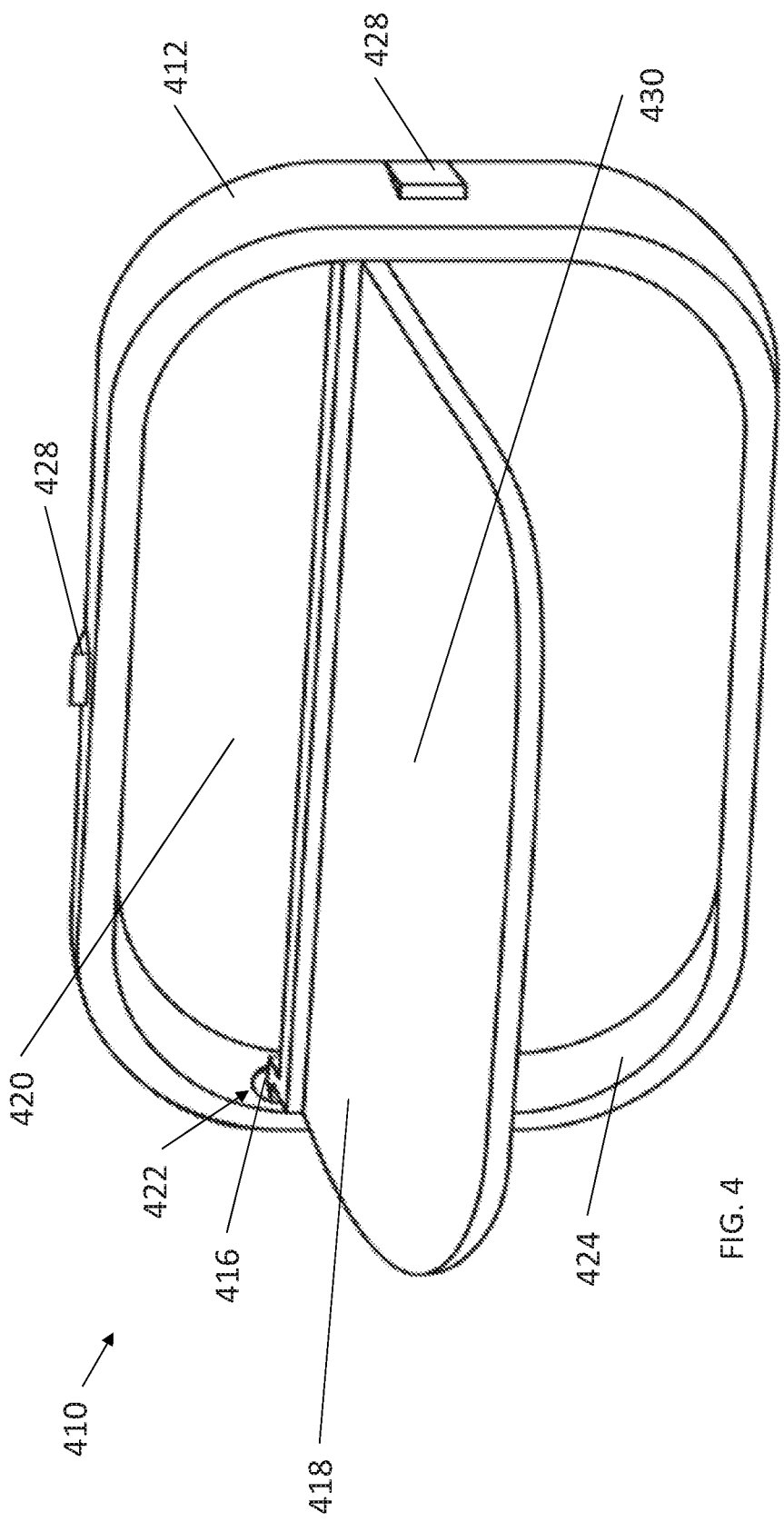

CHECK VALVE FOR DOWNSPOUTS

CROSS-REFERENCE TO RELATED APPLICATIONS

This application claims priority to U.S. Provisional Application No. 62/363,101, filed Jul. 15, 2016 and titled "CHECK VALVE FOR DOWNSPOUTS," the entire contents and disclosure of which is hereby incorporated by reference.

FIELD OF THE INVENTION

The present invention relates to commercial, residential and public rain gutter systems, roof drainage system downspouts and scuppers where flow of effluent rain water passes through downspout pipes to open ended discharge points. Solutions are required where intrusion by animals and pests into the downspouts is not desirable. More particularly, the present invention relates to valve devices that may be installed into existing systems, incorporated into new systems or built into the downspout drain pipes and that deter intrusion into such systems.

BACKGROUND OF THE INVENTION

Proper roof drainage is an important aspect for any building, home, or solid roofed or otherwise non-pervious roofed structure. Standing effluent can cause undesirable added weight, can infiltrate roofing materials, can leak and can cause structural damage. Use of traditional roofing materials, roof drains, rain gutters, scuppers and downspouts, familiar to those skilled in the art, are typically employed to facilitate drainage of effluent, such as rain effluent, off of roofing and away from primary structures. In particular, downspouts are used to channel water out of rain gutters toward a street gutter leading to municipal drainage systems.

In many cases, debris can accumulate in rain gutters and downspouts and interfere with or otherwise impede proper flow. However, accumulation of debris can often be expelled naturally and washed away by heavy effluent flow. Using permanent or fixed grating at the open ends of downspouts can lead to unnecessary buildup of such debris, leading to undesirable consequences including washed out rain gutters. As such, permanent or solid grated end covers are seldom used in the real world.

Another important issue related to downspouts results from the displacement of large populations of animals and pests due to the expansion of urban and suburban sprawl. When located in or near residential, commercial and industrial zones, these animals are considered a nuisance to humans and can carry disease. Examples of these types of animals include: reptiles, amphibians, squirrels, mice, rats, birds, insects and many others. Many of these animals build or maintain a nesting ground, home or other safe haven location away from the elements and predators. When minimal or no effluent is flowing these animals can intrude into drainage systems and live there on a permanent or semi-permanent basis. Downspouts with unguarded open ends are often located at or near ground level and can create access to otherwise unreachable areas with ideal living locations for these animals. These can include areas both on the structure exterior, such as under roof tiles or awnings, and areas on the structure interior, such as in small passages above ceilings and in attics.

Integrated Pest Management (IPM) is an industry that manages pests according to three basic fundamentals: 1) preventing attraction of pests, 2) excluding pests from entry to manmade structures and 3) exterminating pests with safe and effective methods. As described herein, use of pivoting grates can provide both IPM benefits and effluent flow benefits. In particular, IPM benefits can result in successful application of both the first and second fundamentals of IPM and, as a secondary result, a reduced need for the third fundamental.

Currently there are few plastic covers or other grates on the market for downspouts that allow for effective effluent and debris drainage. Those prior art solutions that do exist are typically of monolithic construction with no moving parts. As such, these grates often impede or otherwise restrict the flow of effluent, resulting buildup of debris within the downspout and, in some cases, complete blockage of the downspout exit. Thus, when placed over downspout exits, these grates often require frequent maintenance in order to dislodge and remove the debris buildup, costing time and effort for users in order to remain effective. These problems result in the infrequent use of these types of grates for downspouts in the real world.

Therefore, there is a need for systems, methods and devices for protecting the open ends of downspouts from animals and pests attempting to infiltrate associated drainage systems while not negatively impacting their normal effluent channeling benefits, in order to promote health, safety and peace of mind and to avoid costly extermination bills.

SUMMARY

Provided herein are embodiments of systems, methods and devices for providing check valves for open ended downspouts. The configuration of these devices is described in detail by way of various embodiments which are only examples. Downspout check-valves described herein can act as both animal deterrents and animal protection and can be easily be coupled with downspouts by being pushed into, around or on open ends of potentially problematic downspouts. In many of the embodiments described herein, this can be achieved without the need for any additional or secondary tools.

According to one aspect of the invention, a check valve for deterring intrusion into downspouts can include a body member having at least a first orifice and configured to mount on or otherwise couple with a downspout, wherein the downspout is adapted to promote fluid flow in a single direction through an orifice. This can include a trapdoor, also referred to interchangeably herein as a valve member and flap, that can be pivotably or otherwise rotatably mounted on or otherwise coupled with a body member of the check valve. One example of a pivotable mounting is a hinge. This arrangement can provide a closed trapdoor position for substantially occluding the first orifice and a range of open trapdoor positions when the trapdoor is pivoted about the coupling to open in the flow direction. Thus, the flap can be in a closed position when the check valve is not draining water and can prevent pests from entering the downspout drainage system, while when the flap is in a partially or fully open position the check valve can allow effluent water and any debris therein to flow uninhibited out of the downspout. Advantages of this setup include the effective prevention of animal intrusion into a downspout discharge exit in the closed position and minimal effluent flow restriction or maximum flow enablement in an open or partially open position.

In some embodiments, one or more additional orifices can be provided in either the body member, the valve member or both, in order to permit fluid to flow through the check valve irrespective of the position of the valve member. As such, in some embodiments, a trap door restricts access to the interior of a coupled downspout system while auxiliary grating allows drainage flow.

One advantage over conventional monolithic downspout covers and grates is that check valves described herein can allow for dynamic flow changes for effluent, based on changing environmental conditions. Some features that differentiate these various embodiments of the present check valves from the prior art grates, include: simple construction, features that enable quick and easy field installation without tools, debris directing internal grates, information display surfaces, serrations or points on the valve member edges that catch animals attempting to burrow underneath, serrations penetrating debris deposited in the downspout to allow for consistent closure, internally expanding bodies or bands with conforming sections to maximize pipe coupling options, barb projections on the perimeter of the body and self-closing functionality.

Some embodiments disclosed herein include bodies that can be stretched, compressed or otherwise manipulated to fit on or in ground level open ends of downspouts, such that they can be clamped or otherwise locked in place.

Other systems, devices, methods, features and advantages of the subject matter described herein will be or will become apparent to one with skill in the art upon examination of the following figures and detailed description. It is intended that all such additional devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE DRAWING(S)

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

Illustrated in the accompanying drawing(s) is at least one of the best mode embodiments of the present invention. In such drawing(s):

FIG. 2A is an example embodiment perspective view diagram of a check valve device depicting a valve member grate mounted internal to a body member in a closed orientation.

FIG. 3C is an example embodiment diagram of a check valve device depicting a matrixed valve member grate mounted internal to a body member from a perspective view.

FIG. 4 is an example embodiment perspective view diagram of a check valve device including a pivotal mount hinge and projections.

DETAILED DESCRIPTION

Figure 1A:
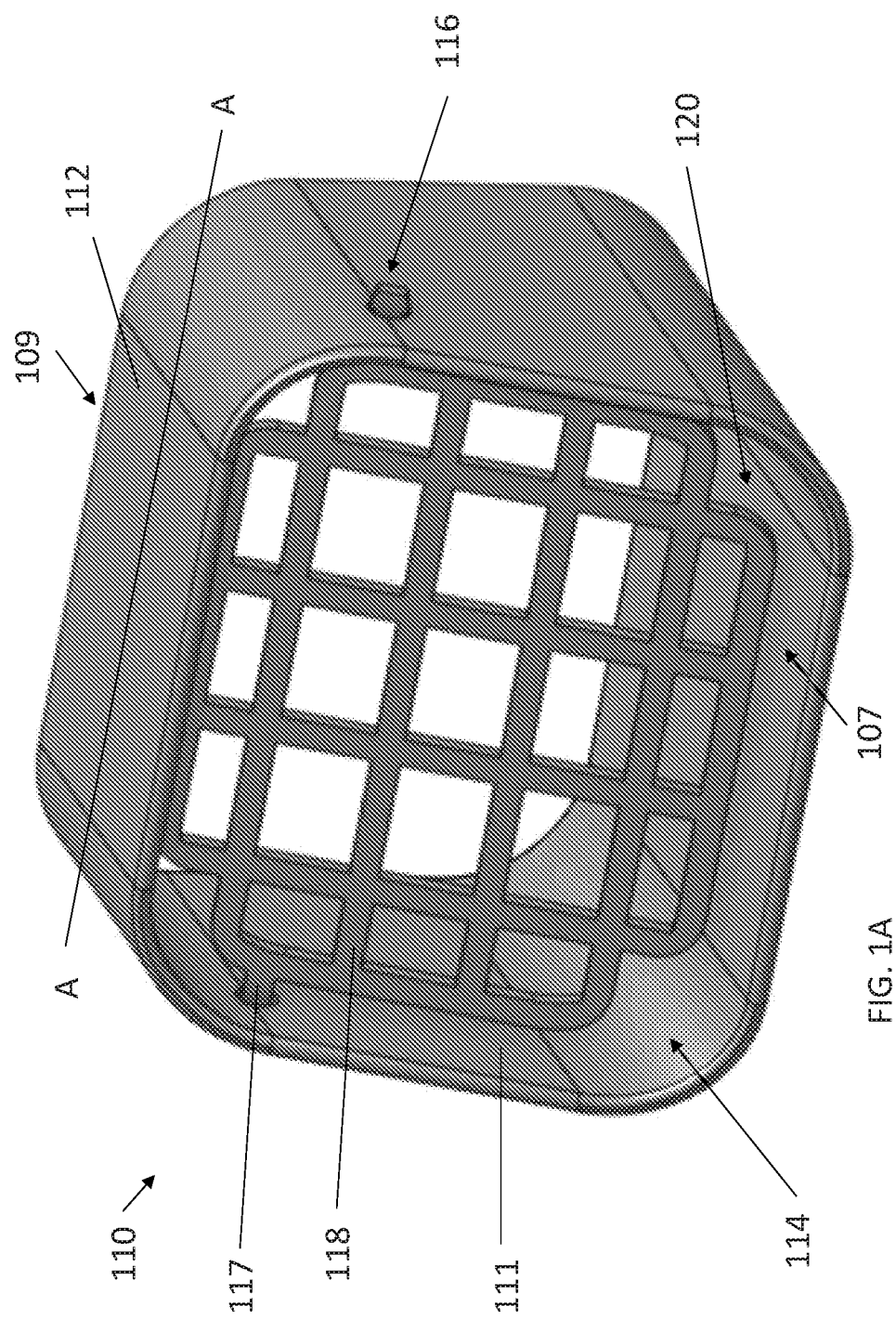
FIG. 1A is an example embodiment diagram of a check valve device depicting a valve member or grate mounted internally with respect to a body member from a perspective view.

Before the present subject matter is described in detail, it is to be understood that this disclosure is not limited to the particular embodiments described, as such may vary. It is also to be understood that the terminology used herein is for the purpose of describing particular embodiments only, and is not intended to be limiting, since the scope of the present disclosure will be limited only by the appended claims.

As described in the summary, embodiments described herein provides a check valve for deterring animal intrusion into open ended downspouts including a body member having at least a first orifice configured to mount on, in or to a downspout opening, wherein the downspout is adapted to promote fluid flow in a single direction. Pivotably or rotatably mounted on, in or to the body member can be a valve member, also referred to herein as a grate member. In some embodiments, the mounting arrangement can provide a closed position that substantially or partially occludes the first orifice and a range of open positions when the valve member is pivoted to open in the flow direction. In addition, in some embodiments, at least one additional orifice can be provided in the body member, the valve member or both, in order to permit fluid flow irrespective of the position of the valve member.

Embodiments, features, components and attributes described herein can be integrated into a system to promote or otherwise accommodate the unobstructed flow of effluent and other debris away from a structure having a gutter system with a downspout, while protecting the downspout and gutter system from occupation by animals or other pests.

A description of a number of embodiments of the present check valve devices and systems is provided, where like numerals refer to like structural elements.

Conventional downspouts are typically of rectangular or circular cross sections, thus most embodiments described herein and shown in the figures will include body members that conform to these standard geometries. However, other geometries are contemplated and the principles disclosed herein can easily be adapted to accommodate these other geometries.

Typically, conventional downspouts have tolerances associated with their components, as affected by their individual manufacture and materials. However, during installation in a gutter and downspout or other fluid flow system, downspouts may be deformed in excess of the manufacturer's tolerance due to heat, mechanical stress or other factors. To account for this, embodiments included herein can also include the ability to adapt to such unintended or otherwise irregular dimensions.

Occasionally, small elements of debris can become entrapped and partially hold valve members open. When valve members are partially held open by such debris, the undesirable effect of permitting animals to enter downspout orifices. These animals may attempt to burrow under valve members but can be discouraged by serrations that can serve to catch on the animal's body, the orientation of which cause the valve member to prevent or discourage forward movement of the animal, while allowing backward movement. To elaborate, failure of valve members to fully close can be mitigated by serrations, scallops, spikes or other edge effects (generically termed "serrations" herein) located on one or more of a lower edge or side edges of valve members.

A further aspect of this invention is promotion of advertising information for an installer or manufacturer's business, such as a trademark, service mark, logo, telephone number, website or other desired information. Thus, various surfaces of these check valves, including those of valve members and body members, can provide a desirable information display region for advertisements which can be visible to persons nearby.

The embodiments provided include a check valve device comprised of a body member and a valve member connected via at least one a pivot hinge point or location. In some embodiments, pivot hinge mechanisms can be designed such that detent recesses or holes can be molded into or through a check valve body member, with complementary sized pivot pin projections molded into or otherwise coupled with valve members. In some of these embodiments, valve members can be relieved in their corners (if applicable in the particular embodiment) to allow for full closure and seating against interior sealing surfaces of body member. Side edges of valve members can be positioned on an angle of approximately 40 to 75 degrees from horizontal in a closed position to ensure sufficient closure force is applied (in many embodiments by gravity) between valve member edges and body member surfaces.

In some embodiments, a support bar can extend partially or fully across the width of a body member in order to prevent pinching or other structural deforming of any integrally molded pivot hinge assemblies. Various sizes of orifice grate openings can be separated by effluent directors, which may have angled surfaces to direct effluent flow. As such, effluent directors can be angularly oriented internal to the check valve body member such that they direct debris and effluent towards an exit orifice of the valve member. An outside perimeter surface of body members can correspond with an average internal diameter of standard-sized downspout orifices in embodiments where the present check valve device is to be installed within the downspout. Alternatively, the inverse is also contemplated, where interior perimeter surfaces of body members can correspond with an average external diameter of standard-sized downspout orifices.

Figure 1B:
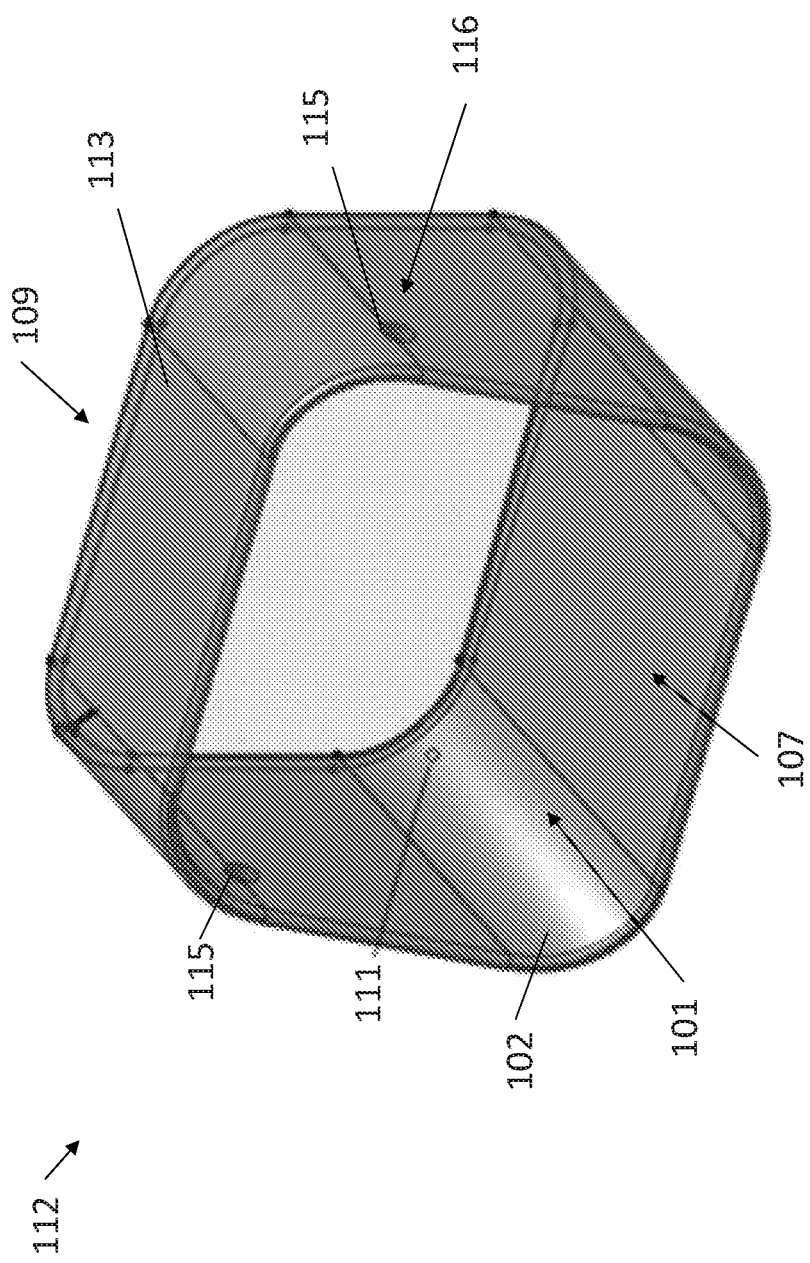
FIG. 1B is an example embodiment perspective view diagram of body member of a check valve device without a grate.
Figure 1C:
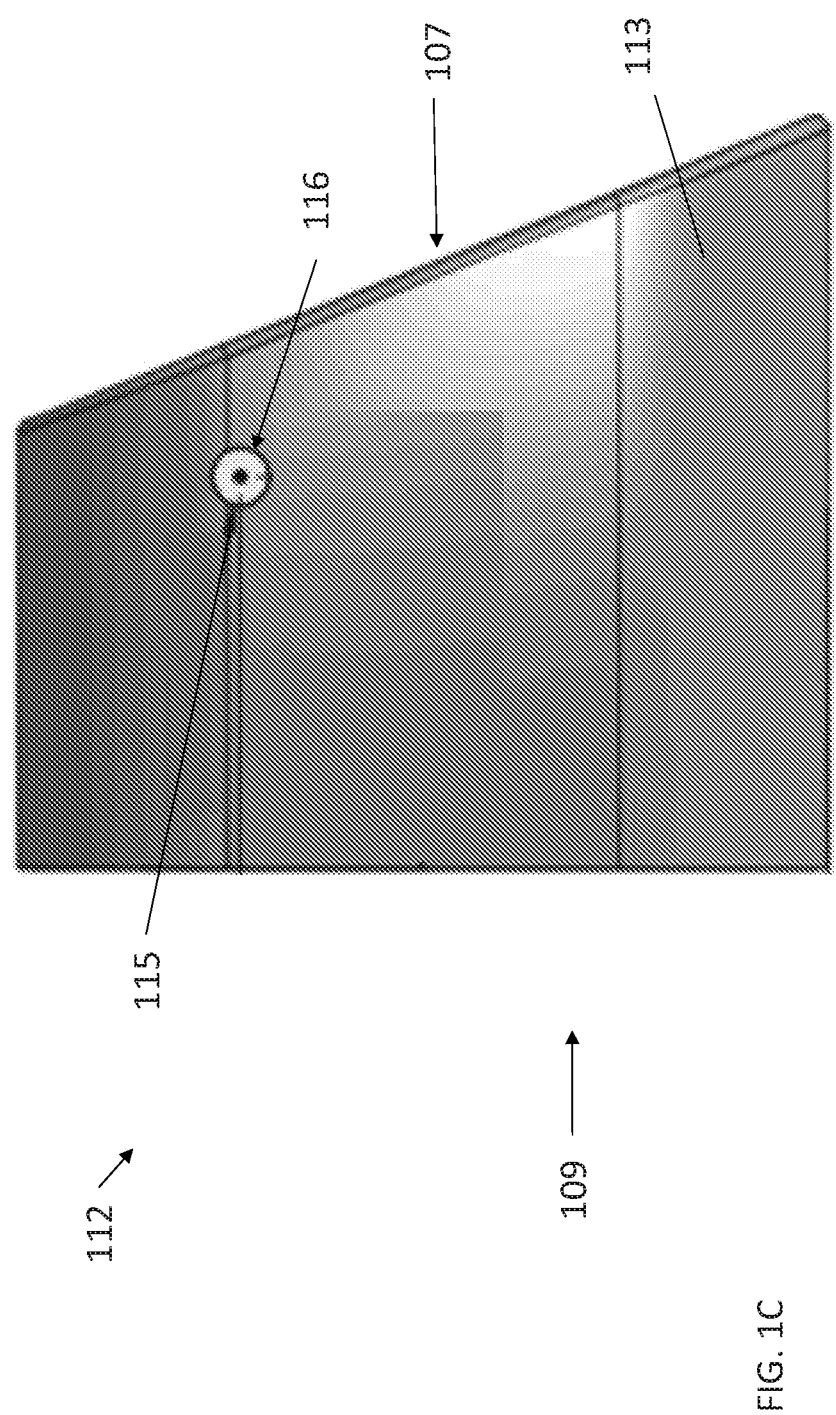
FIG. 1C is an example embodiment diagram of the body member of the check valve device without a grate from a side view.
Figure 1D:
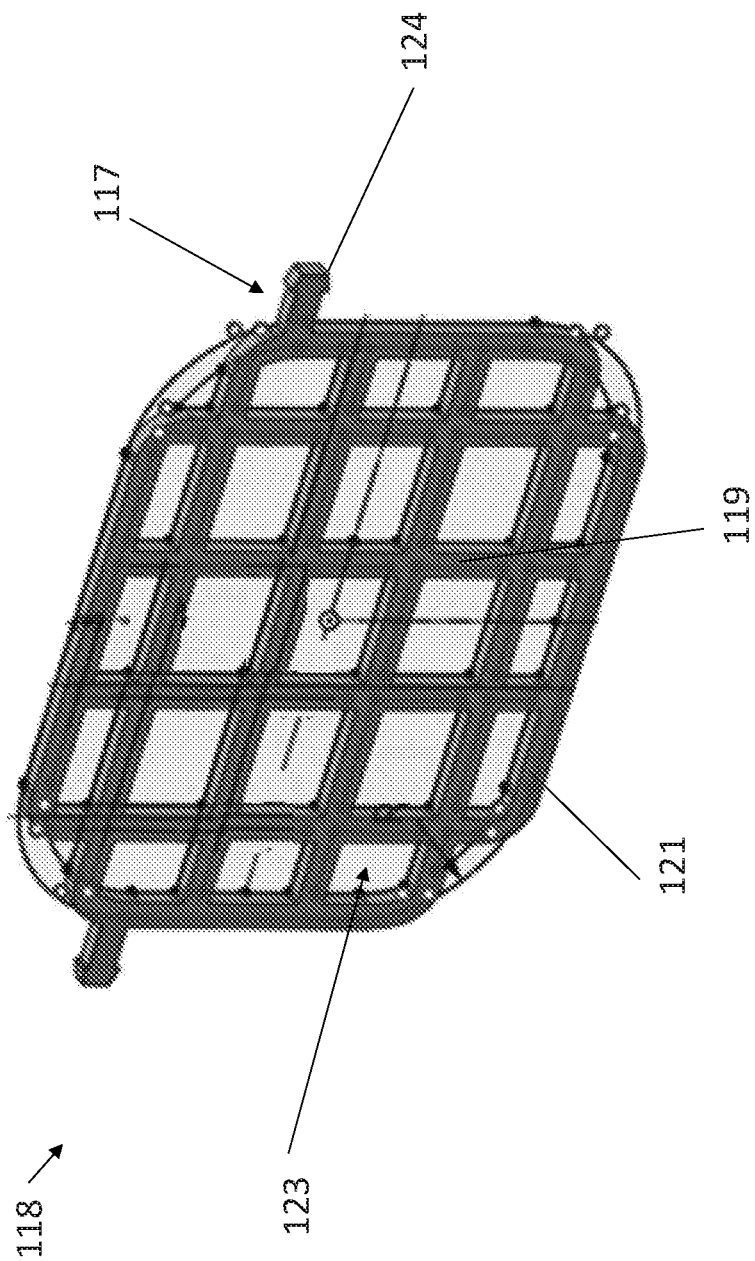
FIG. 1D is an example embodiment perspective view diagram of valve member grate of a check valve device without a body member.
Figure 1E:
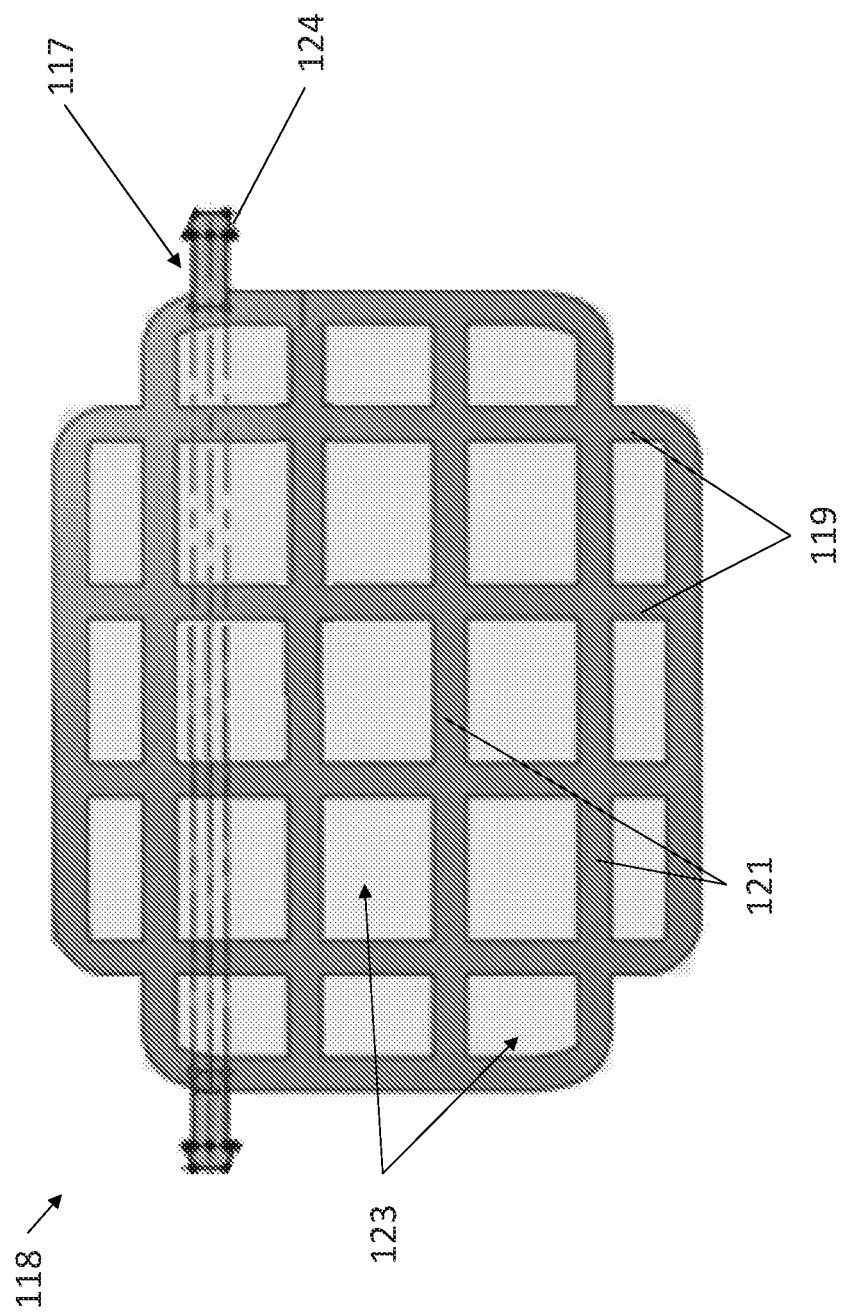
FIG. 1E is an example embodiment diagram showing a front view of a valve member grate of a check valve device without a body member.

FIGS. 1A-1E depict example embodiment diagrams of a check valve device or apparatus and its individual components, including a body member in FIGS. 1B-1C and grate in FIGS. 1D-1E. As such, like numbers represent like elements or structures in FIGS. 1A-1E.

FIG. 1A is an example embodiment diagram of a check valve device 110 depicting a valve member or grate 118 mounted internally with respect to a body member 112 from a perspective view. As shown in the example embodiment, check valve device 110 can include a body member 112 that is configured to permit the device to be attached, affixed, mounted, or otherwise coupled with a downspout. In some embodiments, this coupling can be detachable, while in others it can be permanent. Body member 112 can have a generally rectangular cross section along line A-A. As shown, this cross section can have rounded corners. Other cross-sectional shapes are also contemplated for various other embodiments, including circular, oval, square, triangular, and others, with rounded or squared of corners where applicable, in order to effectively couple with a downspout.

Body member 112 generally includes one or more walls that define an opening or other orifice 114 for effluent flow and also serves as a structural element for one or more pivot or hinge points 116 of grate 118 of check valve device 110.

In addition, grate or valve member 118 can be shaped such that it creates at least one additional external valve member orifice 120 (shown in the FIG. 1A as a plurality of orifices external to an outer perimeter defined by valve member grate 118) with body member 112.

FIG. 1B is an example embodiment perspective view diagram of body member 112 of a check valve device, e.g. device 110 of FIG. 1A, without a grate. In various embodiments, body member 112 can be a unitary structure or a combination of multiple or a plurality of separate structures that can be coupled to create a unified structure. Here, body member 112 is a unified or otherwise unitary structure with a generally rectangular shaped wall 102 with an internal surface 111 that defines a hollow internal space 101 and an external surface 113. Wall 102 can include one or more holes 115 at hinge points 116 to allow for coupling with a valve member grate.

FIG. 1C is an example embodiment diagram of the body member of the check valve device of FIGS. 1A and 1B without a grate from a side view. As shown a flow entry side 9 can be opposite a flow exit side 7 of an orifice, while top and bottom surfaces of the body can be parallel. Flow entry side 9 can be perpendicular to the top and bottom surfaces of the body 12 while flow exit side 7 can be angled, in this embodiment, shown as upward. The angle can be about forty-five degrees in some embodiments, sixty degrees in others, third in still others, and a variety of differing amounts in yet others.

FIG. 1D is an example embodiment perspective view diagram of valve member grate 118 of a check valve device, e.g. device 110 of FIG. 1A, without a body member. As shown in the example embodiment, grates 118 can include one or more arms 117 for coupling with holes of a body member. In the example embodiment, two arms 117 extend outward from the sides of grate 118. These arms 117 have tabs 124 that have a slightly larger width than the arms themselves, such that they are generally difficult or prevent removal once inserted into holes of a body member. As such, they are able to maintain a coupling with a body member when inserted in the holes.

As shown in the example embodiments, a series of vertical bars 119 are aligned parallel to each other. Vertical bars 119 are aligned perpendicular to a series of horizontal bars 121 that are parallel to each other. As such, bars 119 and 121 are formed in a regularly spaced arrangement and combine to form orifices 123 in grate 118 such that fluid and particulates can flow through while larger debris can be caught. Further, grate 118 is operable to prevent vermin or other pests from entering a coupled body member and downspout when in use. Although the example embodiment shows vertical and parallel bars that are regularly spaced, it should be understood that bars or other grating can be formed differently in different embodiments. This can include diagonal bars, circular or other shaped orifices, and various others.

FIG. 1E is an example embodiment diagram showing a front view of a valve member grate 118 of a check valve device, e.g. 110 of FIG. 1A, without a body member. As shown in the example embodiment, tabs 124 can have angled edges such that they are easily inserted into holes in a body member for coupling. These can terminate in vertically or nearly vertical edges to prevent easy dislodgement. Also, it should be noted that arms 117 are generally located near an upper portion of grate 118. This allows grate 118 to swing outwardly when pushed from inside a coupled downspout and once force ceases, for example if fluid or debris passes clear of grate 118, gravity can swing it back to its original position. In some embodiments, grate 118 can be comprised of one or more wires that are woven and coupled together by one or more knots, welds, adhesive application points, or other fixations.

FIG. 2A is an example embodiment perspective view diagram of a check valve device 210 depicting a valve member grate 218 mounted internal to a body member 212 in a closed orientation. As shown in the example embodiment, a grate member 218 can have similar features to other grates as described herein, including arms and tabs that extend into holes in body member 212 to form device 210. As shown, a relief 222 can be formed by arms or walls 224 of body member 212 that are biased toward each other such that they will grip the exterior of a downspout. In some embodiments, these can be biased outward for an opposite effect and mounting within a downspout.

Further, in some embodiments, at least a portion of an interior surface 211 or exterior surface 216 of body member 212 can include, have applied, or be coupled with features such as adhesives, grip tape, high friction surfaces, and others, such that body member 212 is better able to couple with an exterior or interior surface of a downspout. Also, in some embodiments where body member is mounted on an external downspout surface, valve member grate 218 can rest at least partially against one or more front edge surfaces of a downspout after installation or coupling.

Figure 2B:
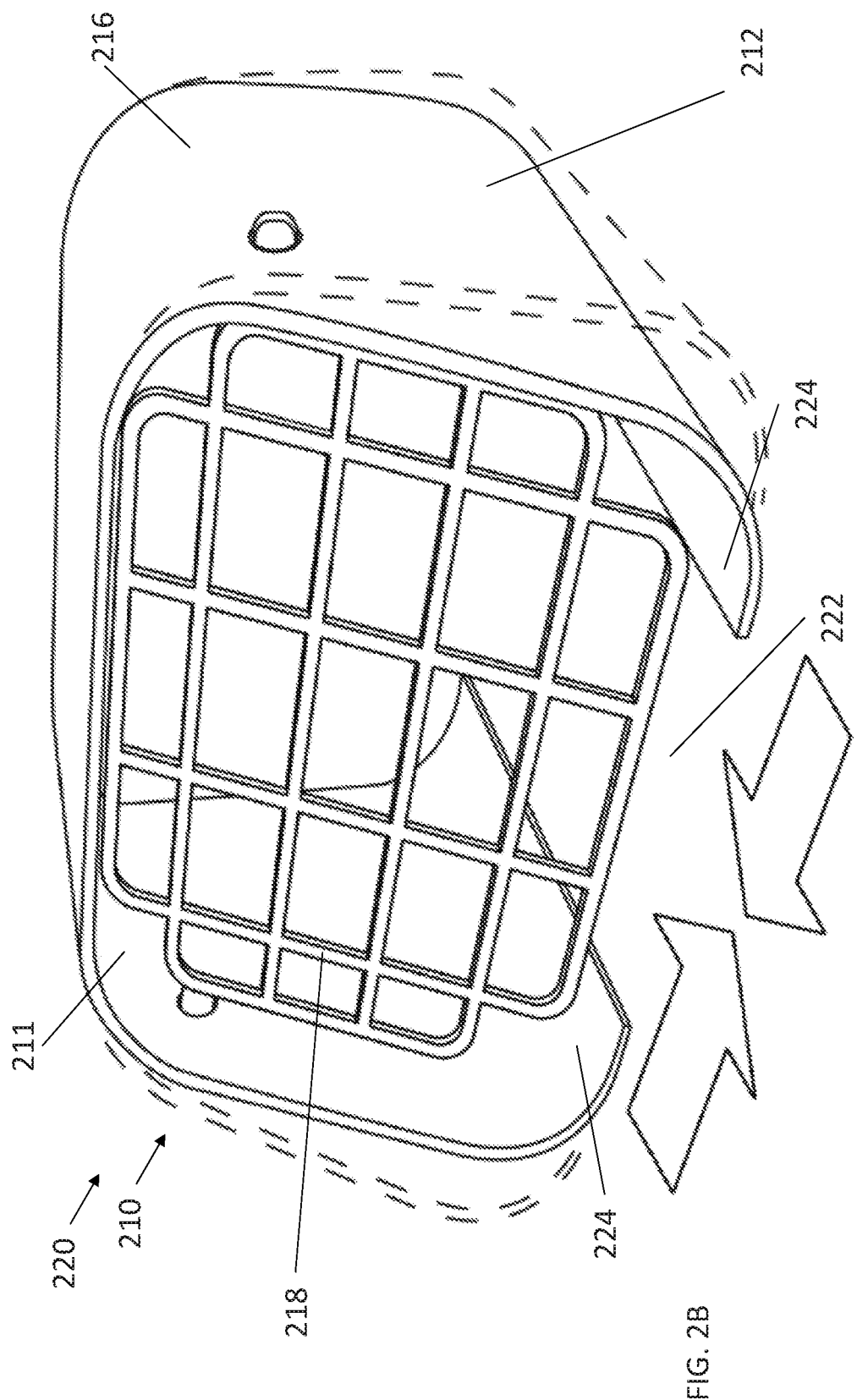
FIG. 2B is an example embodiment diagram of a check valve device depicting a valve member grate mounted internally within a body member.

FIG. 2B is an example embodiment diagram 220 of a check valve device 210 depicting a valve member grate 218 mounted internally within a body member 212. As shown, arrows depicting a closing or biasing motion of arms 224 allows device 210 can be easily coupled or decoupled from a downspout. To elaborate, as shown in the example embodiment, check valve 210 can be easy to install around a downspout exit based on an opening or relief 222 at a bottom side of body member 212. This can also allow unrestricted flow of effluent, through relief 222 and eliminate any "riffle" that could provide a locus for settling of particulate debris. In some embodiments, grate 218 can be easily removed or decoupled by pushing arms 224 apart and pushing grate arms through the coupled holes in body member 212.

Figure 2C:
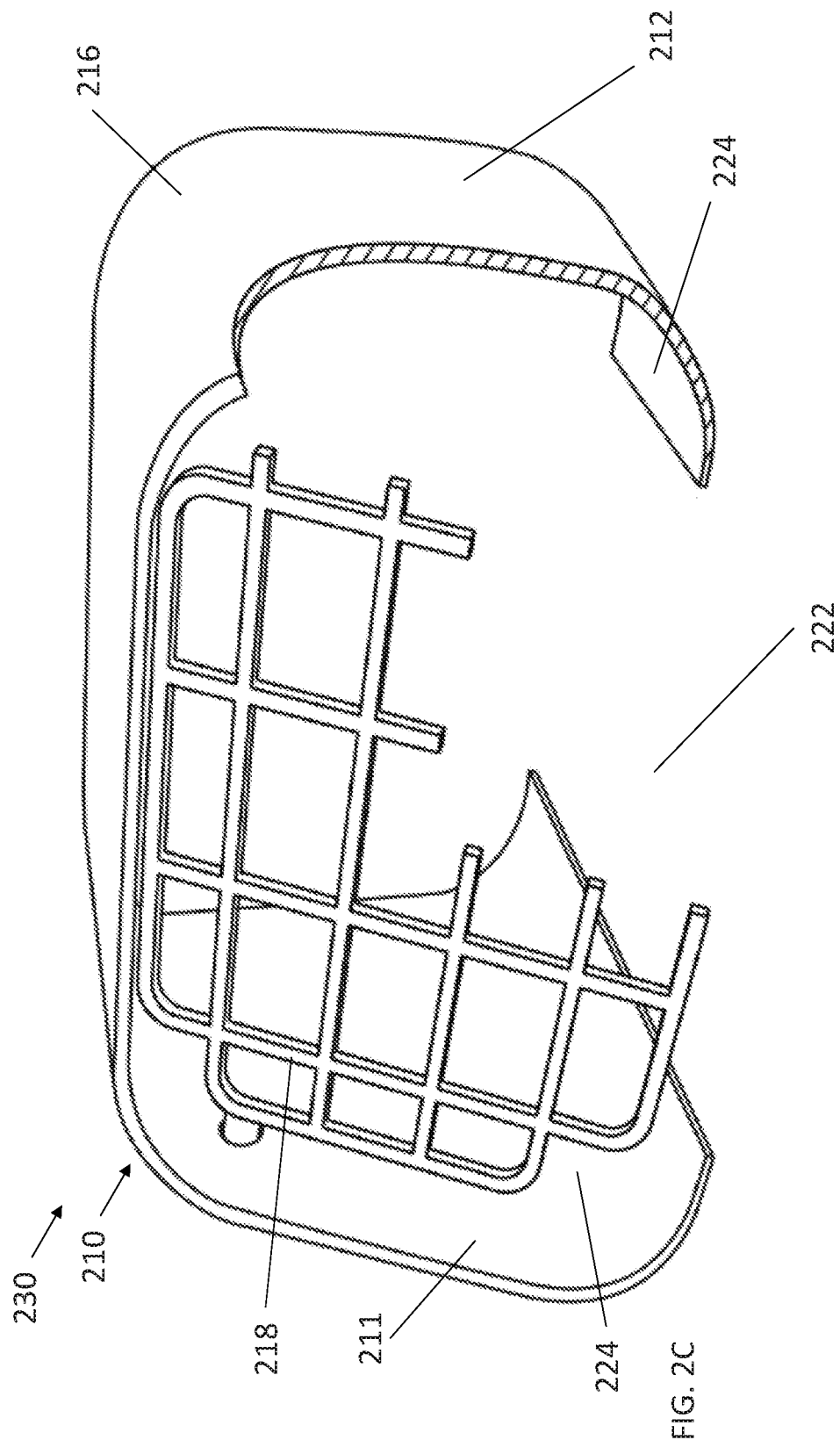
FIG. 2C is an example embodiment diagram of a check valve device depicting a valve member grate mounted internal to a body member, with portions of the grate omitted from a perspective view.

FIG. 2C is an example embodiment diagram 230 of a check valve device 210 depicting a valve member grate 218 mounted internal to a body member 212, as in FIGS. 2A-2B, with portions of the grate omitted from a perspective view.

Figure 3A:
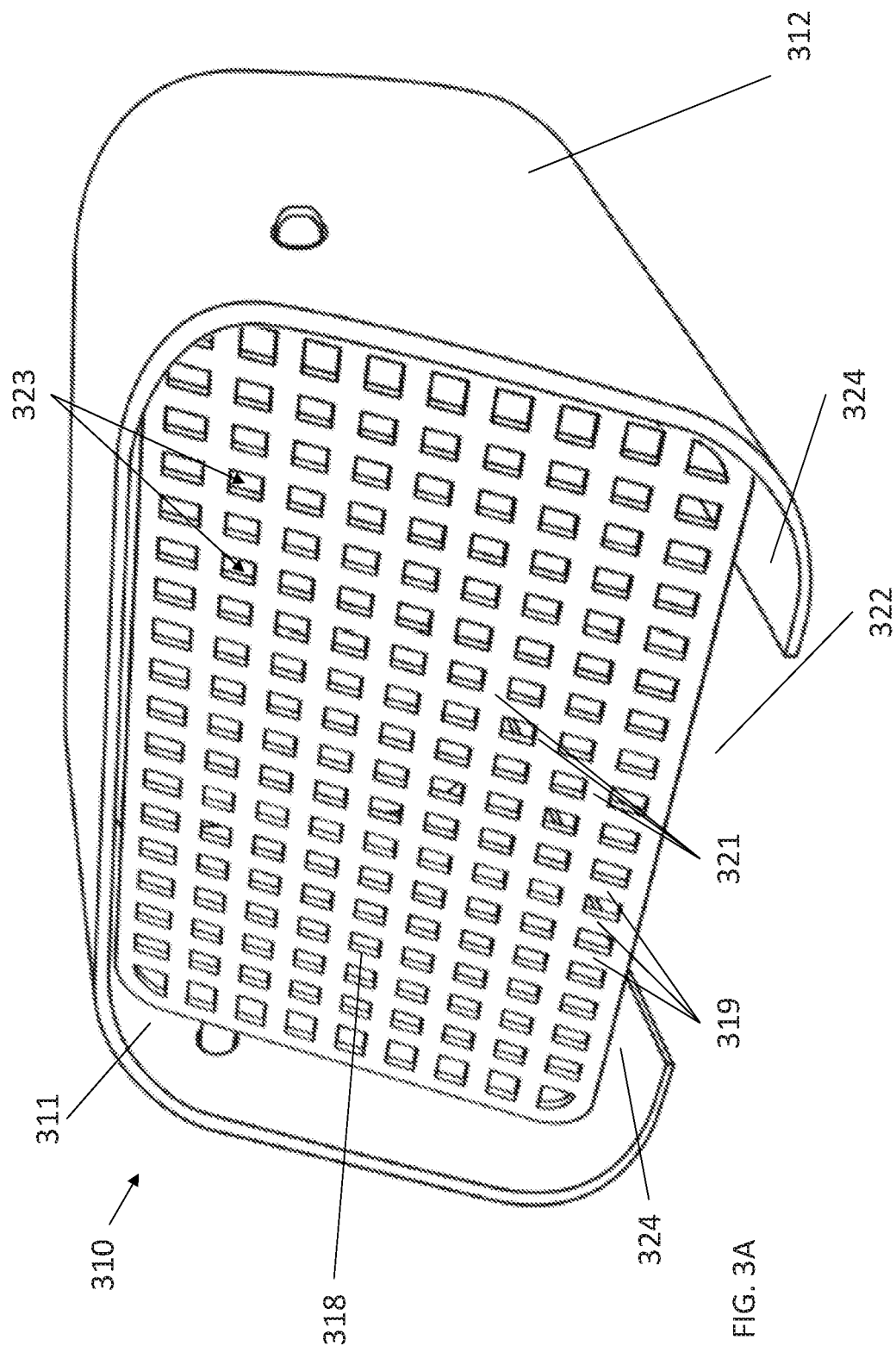
FIG. 3A is an example embodiment diagram of a check valve device depicting a latticed valve member grate mounted internal to a body member from a perspective view.

FIG. 3A is an example embodiment diagram of a check valve device 310 depicting a latticed valve member grate 318 mounted internal to a body member 312 from a perspective view. Similar to body member 212 of FIGS. 2A-2C, a relief 322 can exist between arms 324. As shown, the lattice of grate 318 can be formed by a series of crossing parallel vertical bars 319 that are perpendicular to a series of horizontal bars 321. The lattice created by bars 319 and 321 can form a network of small orifices 323. In the example embodiment, grate 318 substantially covers an internal area of body member 312, such that its external perimeter is nearly as large as an internal perimeter of body member 312 in a primary orientation.

Figure 3B:
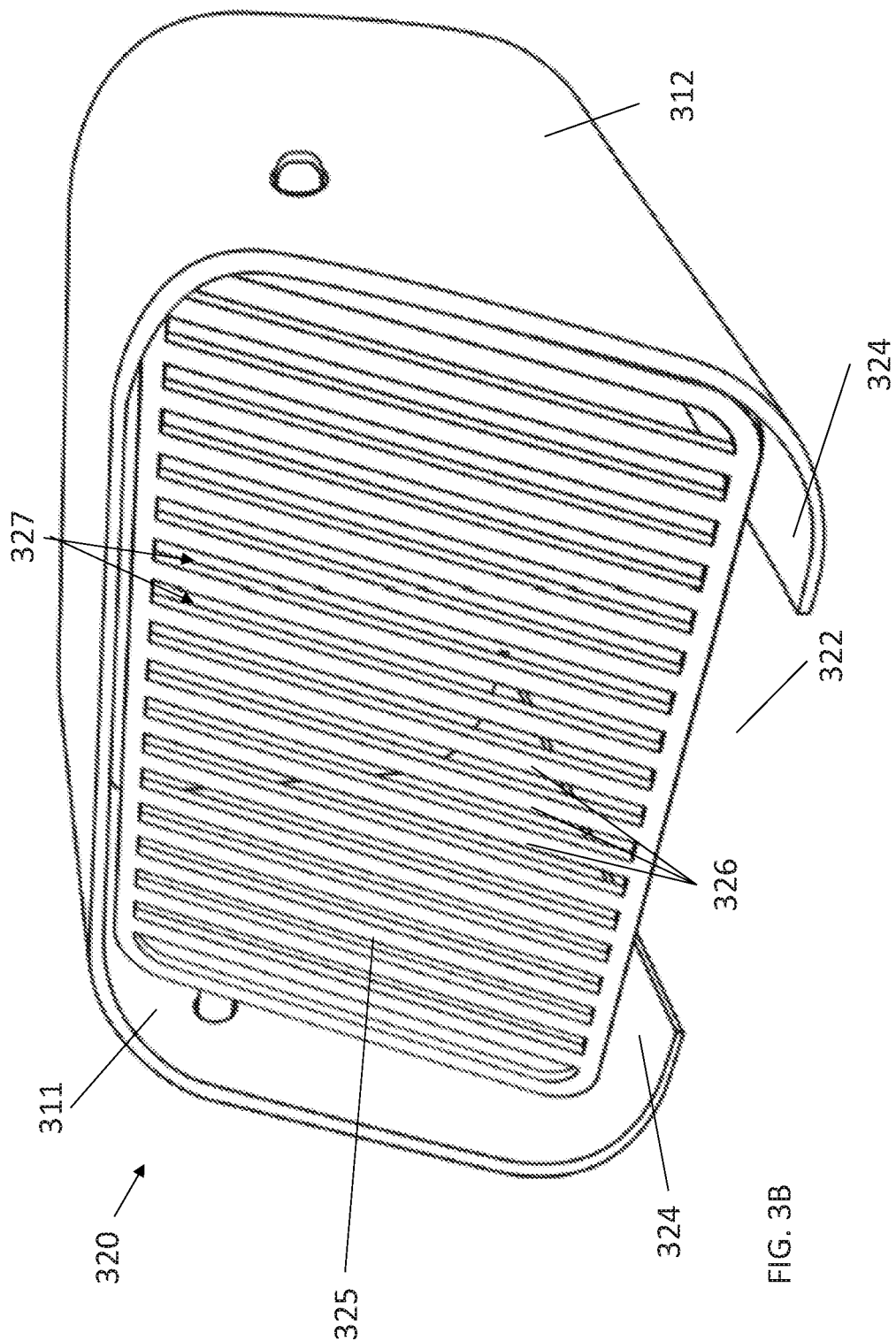
FIG. 3B is an example embodiment of a check valve device depicting a barred valve member grate mounted internal to a body member from a perspective view.

FIG. 3B is an example embodiment of a check valve device 320 depicting a barred valve member grate 325 mounted internal to a body member 312 from a perspective view. Valve member grate 325 can include a series of parallel vertical bars 326 that form openings or orifices 327 between adjacent bars.

FIG. 3C is an example embodiment diagram of a check valve device 330 depicting a matrixed valve member grate 331 mounted internal to a body member 312 from a perspective view. Grate member 331 can be similar to gate member 218 of FIGS. 2A-2C. In the example embodiment, check valve device 330 can include an external ridge 344 that extends partially or wholly around an exterior surface of body member 312. As shown, ridge 344 can have a generally rectangular cross section. Ridge 344 can include sub-ridges or stopping surfaces in some embodiments and can be shaped differently in different embodiments. Ridge 344 can provide a stopping surface when installed in a downspout such that it does not move too far into the downspout during coupling or installation and is able to maintain an optimized position.

Further, in some embodiments, use of a glue, adhesive, or other coupling enhancement can ensure that body member 312 is adequately coupled to an interior of a downspout. This glue, adhesive, or other enhancement can be applied externally to body member 312 or internally onto the interior of the downspout, in an associated location. This can be at, near, or on ridge 344.

FIG. 4 is an example embodiment perspective view diagram of a check valve device 410 including a pivotal mount hinge 416 and projections 428. As shown, one or more projections 428 can be located on an external surface of a body member 412 on an external for securing body member 412 to a downspout. Projections 428 can have a triangular cross section and can be movable or fixed in some embodiments. In the example embodiment, body member 412 can be oriented substantially vertically as shown to reduce or minimize tooling costs during production. Alternatively, body member 412 can be angled with respect to a vertical plane, such that a valve member 418 is maintained in a closed position by gravity in a normal orientation, e.g. when not open. Projections 428 can include a simple barb mechanism in some embodiments that can serve to retain check valve device 410 in the downspout. A visible marketing or information display surface 430 can also be provided on valve member 418 in various embodiments. In the example embodiment, an opening 420 is provided above valve member 418.

The one or more mount hinges 416 can include small projections that can be retained within complementary sized holes or depressions 422 on or in an inner surface 424 of body member 412. Mount hinge 416 can be a portion of valve member 418 or can be coupled to valve member 418 in various embodiments. As shown in the example embodiment, valve member 418 can be a unitary panel that has no orifices in various embodiments. Alternatively, it can have lattice, matrix, bar, or other structures as contemplated herein. Further, in some embodiments, a separate panel, lattice, matrix, or other structure (not shown) can be included that is part of or coupled to body member 412 to block opening 420 above valve member 418. Also, in some embodiments, the size of valve member 418 can be reduced such that more than one valve member 418 can be included and arranged in parallel, above and below each other.

Figure 5:
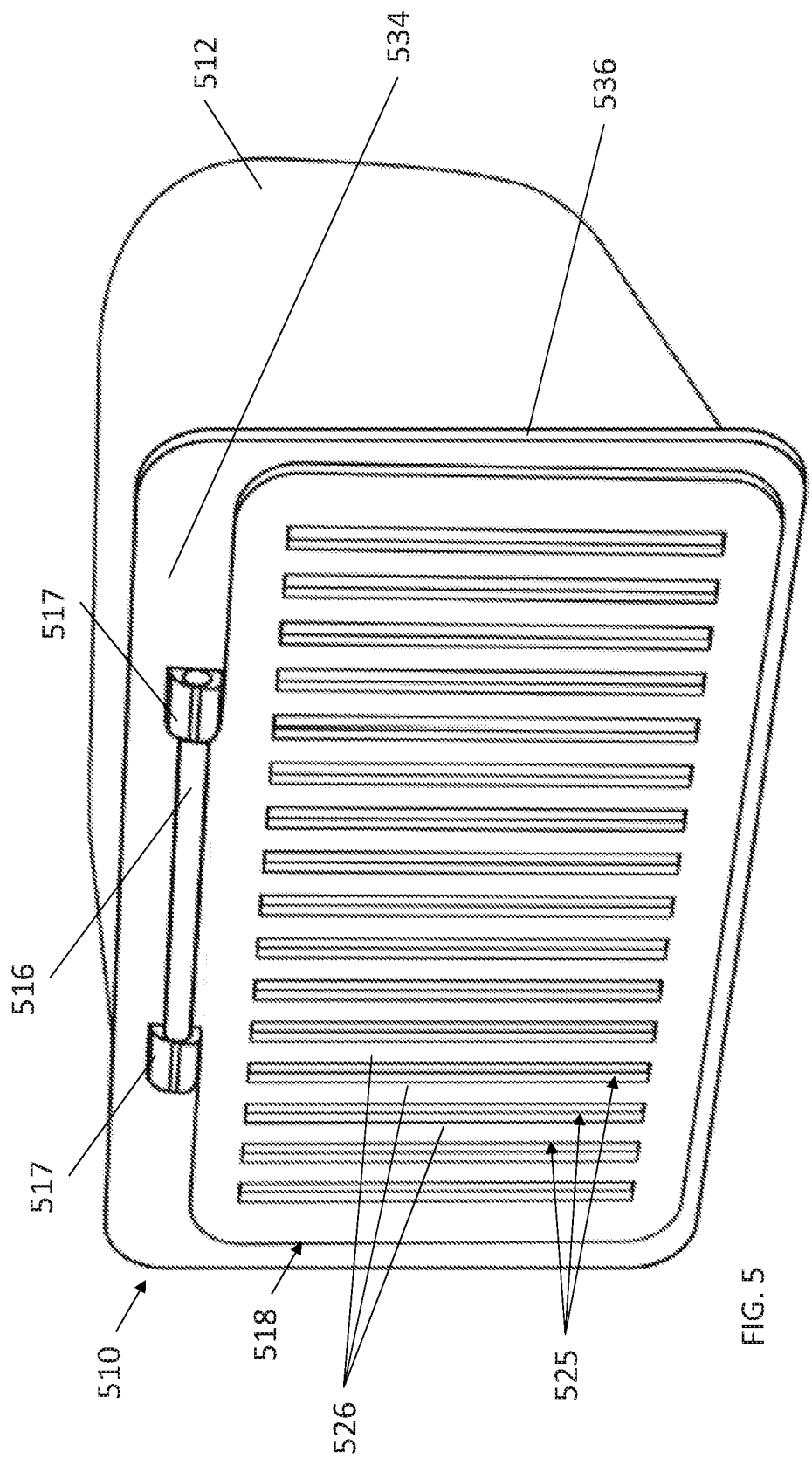
FIG. 5 is an example embodiment perspective view diagram of a check valve device having a valve member grate coupled to a rectangular cross-sectional body member by a hinge.

FIG. 5 is an example embodiment perspective view diagram of a check valve device 510 having a valve member grate 518 coupled to a rectangular cross-sectional body member 512 by a hinge 516. As shown in the example embodiment, check valve device 510 has hinge mechanism 516 that is generally a cylindrical bar and is part of or coupled to an upper edge of valve member 518. Hinge mechanism 516 can be retained within one or more coupling extensions 517 that are part of or coupled to a front external surface 534 of a front plate 536 of body member 512. Extensions 517 can be shaped such that they receive an end or arm of hinge mechanism 516. Extensions 517 can be open on one or more sides and can also function as a clip or other coupling mechanism in various embodiments. Front plate 536 can be shaped slightly larger than valve member grate 518. Further, front plate 536 can be coupled to body member 512 or integrated as a unitary structure.

As shown, valve member 518 is generally located at a front external surface 534 of body member 512. As a result, valve member 518 can substantially or fully cover a hollow interior space of body member 512 and can swing open partially or fully to reach an extended or open position about hinge 516 during heavy effluent flow. Valve member 518 can include one or more vertical bars 526, arranged in parallel such that one or more openings or orifices 525 are located between adjacent bars.

Figure 6A:
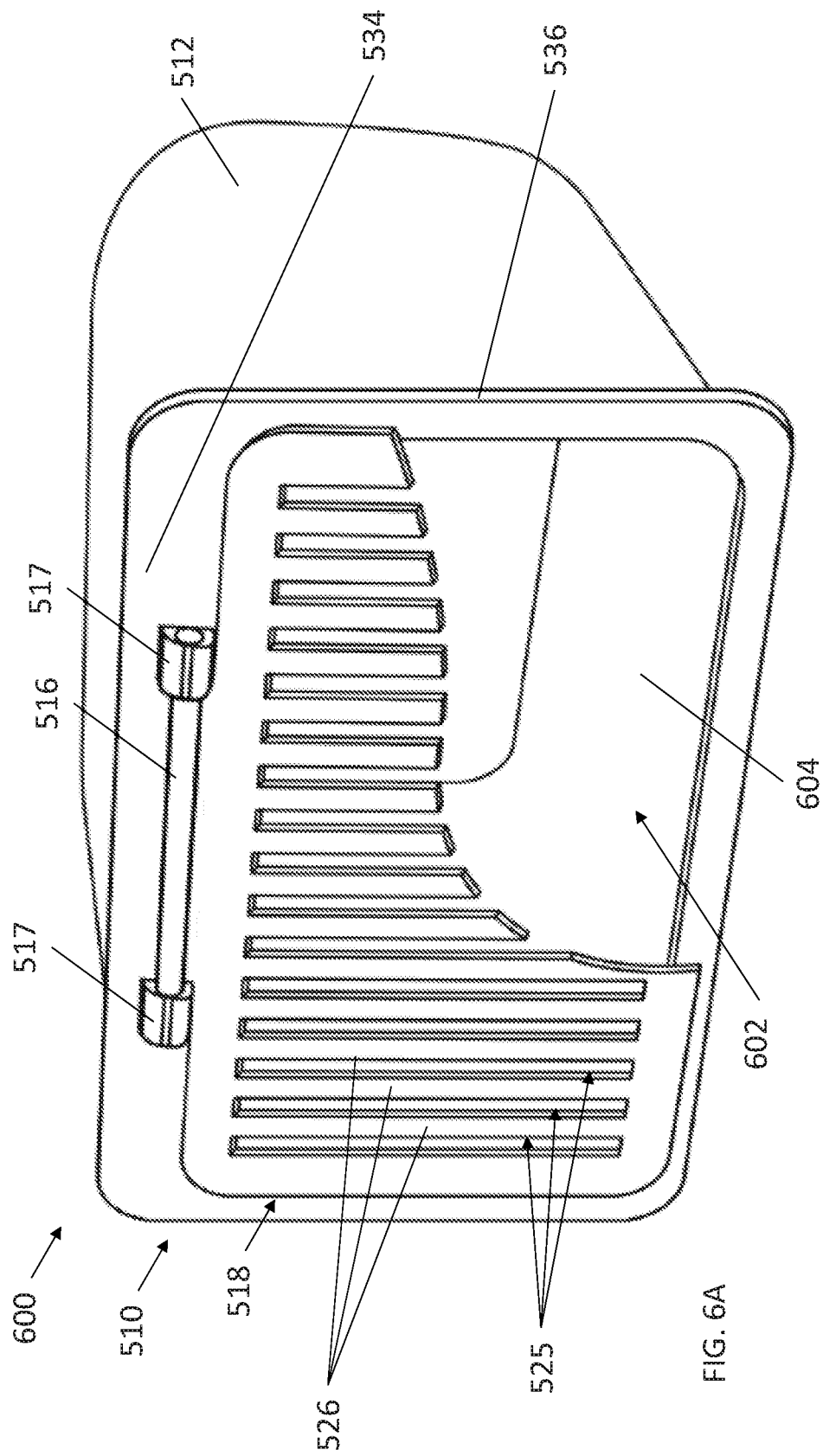
FIG. 6A is an example embodiment perspective view diagram of a check valve device having a grate coupled to a rectangular cross-sectional body member by a hinge with a portion of grate cut away to show an interior of body member.

FIG. 6A is an example embodiment perspective view diagram 600 of a check valve device 510 having a grate 518 coupled to a rectangular cross-sectional body member 512 by a hinge 516 with a portion of grate 518 cut away to show an interior of body member 512. As shown in the example embodiment, an internal hollow area 602 can be defined by interior surfaces of one or more walls 604 of member body 512.

Figure 6B:
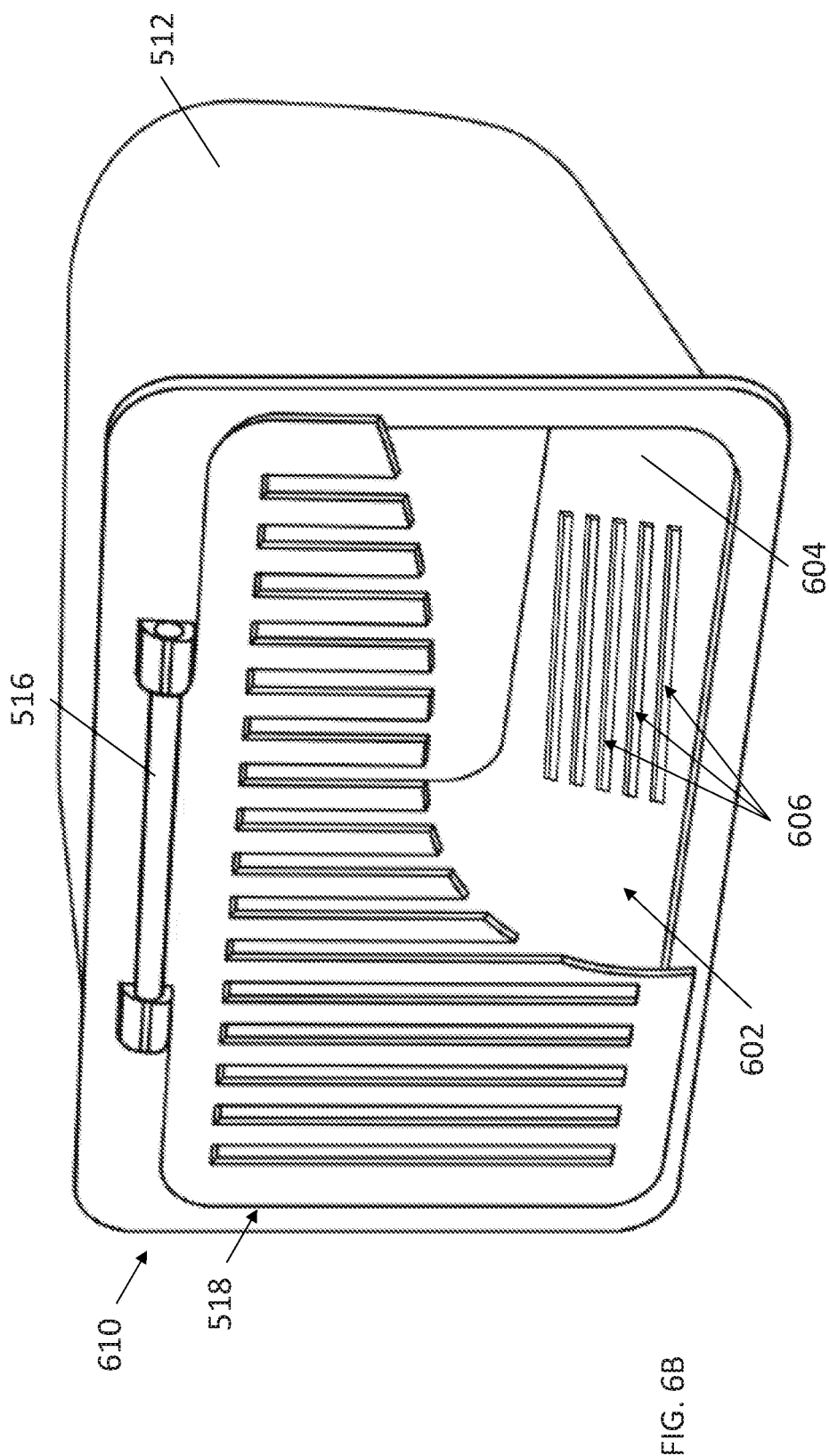
FIG. 6B is an example embodiment perspective view diagram of a check valve device having a grate coupled to a rectangular cross-sectional body member by a hinge with a portion of grate cut away to show an interior of body member.

FIG. 6B is an example embodiment perspective view diagram 610 of a check valve device 610 having a grate 518 coupled to a rectangular cross-sectional body member 512 by a hinge 516 with a portion of grate 518 cut away to show an interior of body member 512. As shown in the example embodiment, an internal hollow area 602 can be defined by interior surfaces of one or more walls 604 of member body 512. Also shown in the example embodiment, are orifices 606 in the bottom of body member 512. In various embodiments, other orifices or grate regions including orifices can provide an additional avenue for flow of effluent out of member body 512, in addition to valve member 518.

Figure 6C:
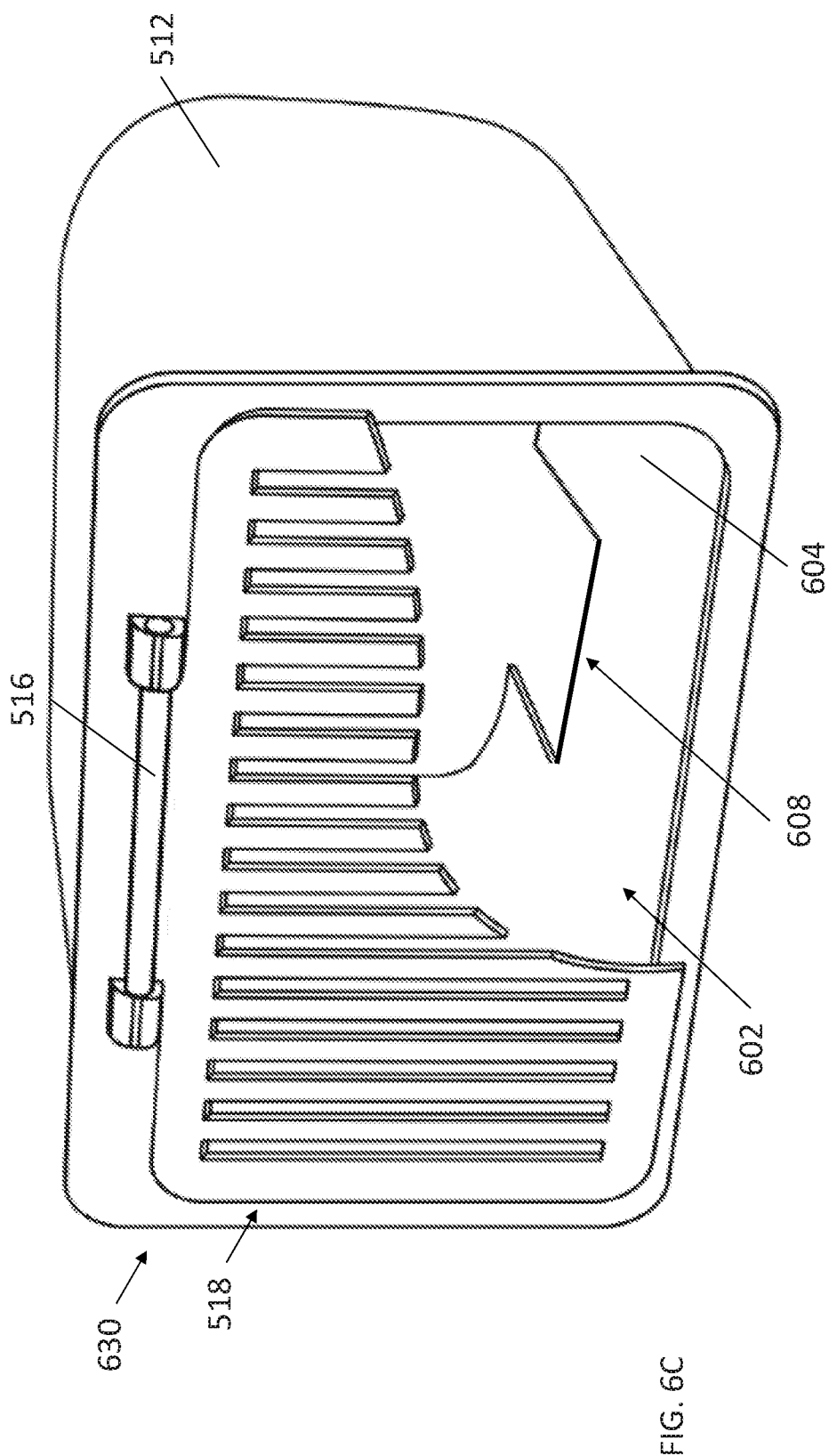
FIG. 6C is an example embodiment perspective view diagram of a check valve device having a grate coupled to a rectangular cross-sectional body member by a hinge with a portion of grate cut away to show an interior of body member.

FIG. 6C is an example embodiment perspective view diagram 630 of a check valve device 610 having a grate 518 coupled to a rectangular cross-sectional body member 512 by a hinge 516 with a portion of grate 518 cut away to show an interior of body member 512. As shown in the example embodiment, an internal hollow area 602 can be defined by interior surfaces of one or more walls 604 of member body 512. As shown in the example embodiment, a cutout portion or section 608 of member body 512 can allow drainage of effluent out of the bottom of member body 512.

Figure 7:
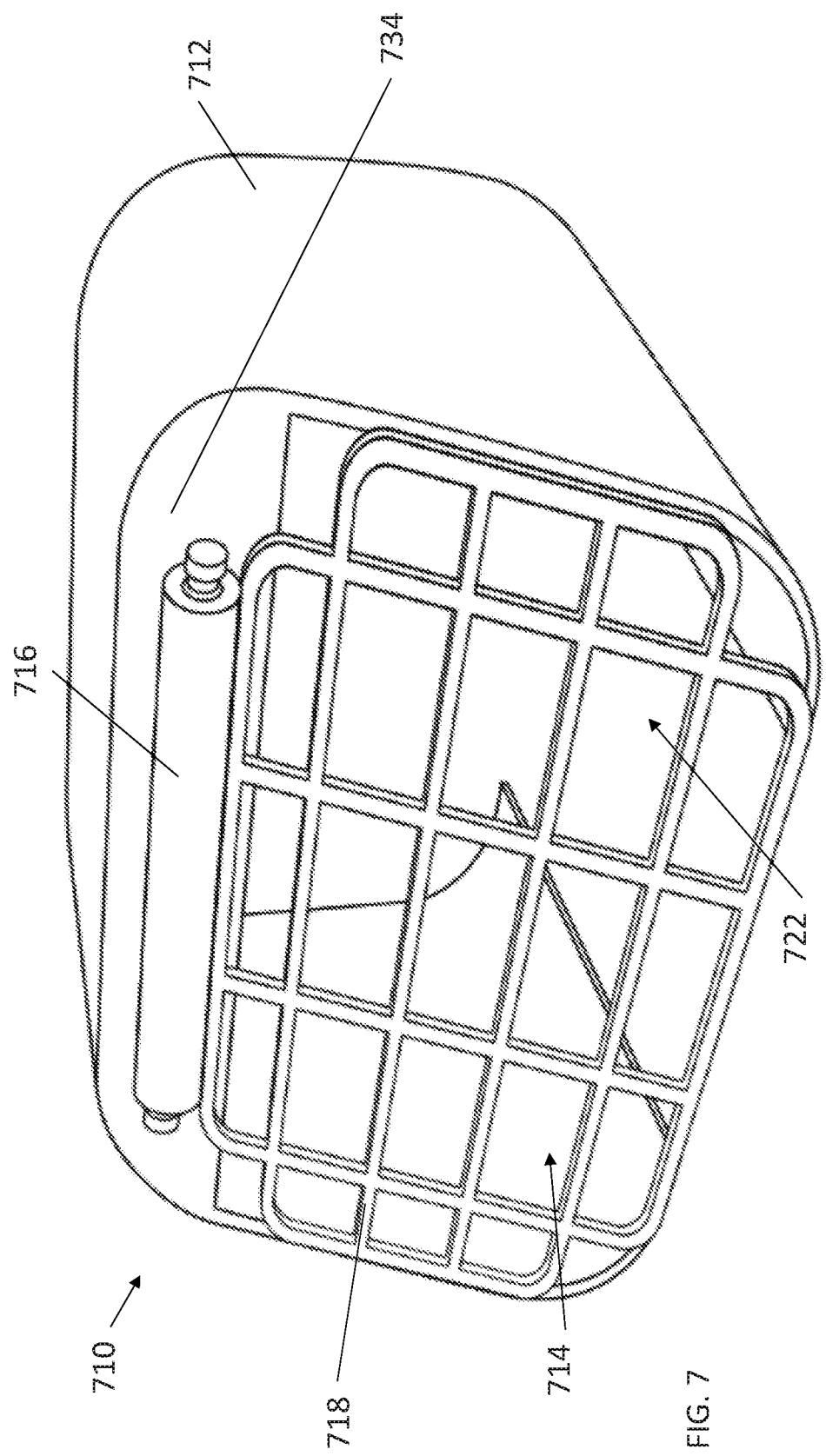
FIG. 7 is an example embodiment perspective view diagram of a check valve device having a body member and a valve member.

FIG. 7 is an example embodiment perspective view diagram of a check valve device 710 having a body member 712 and a valve member 718. Valve member 718 can be coupled to body member 712 by hinge 716. In various embodiments, this can be a removable or permanent hinge. As shown in the example embodiment, it can be generally cylindrical and can have protrusions at either end to allow for adjustment. As shown in the example embodiment, a front surface 734 of member body 712 can be angled, such that valve member 718 rests against front surface 734 in a standard or normal position. Valve member 718 can thus cover orifice 714 in a standard orientation when closed. Also shown is an opening or relief 722, which can function and have a similar structure to relief 322 of FIG. 3A-3C.

Figure 8:
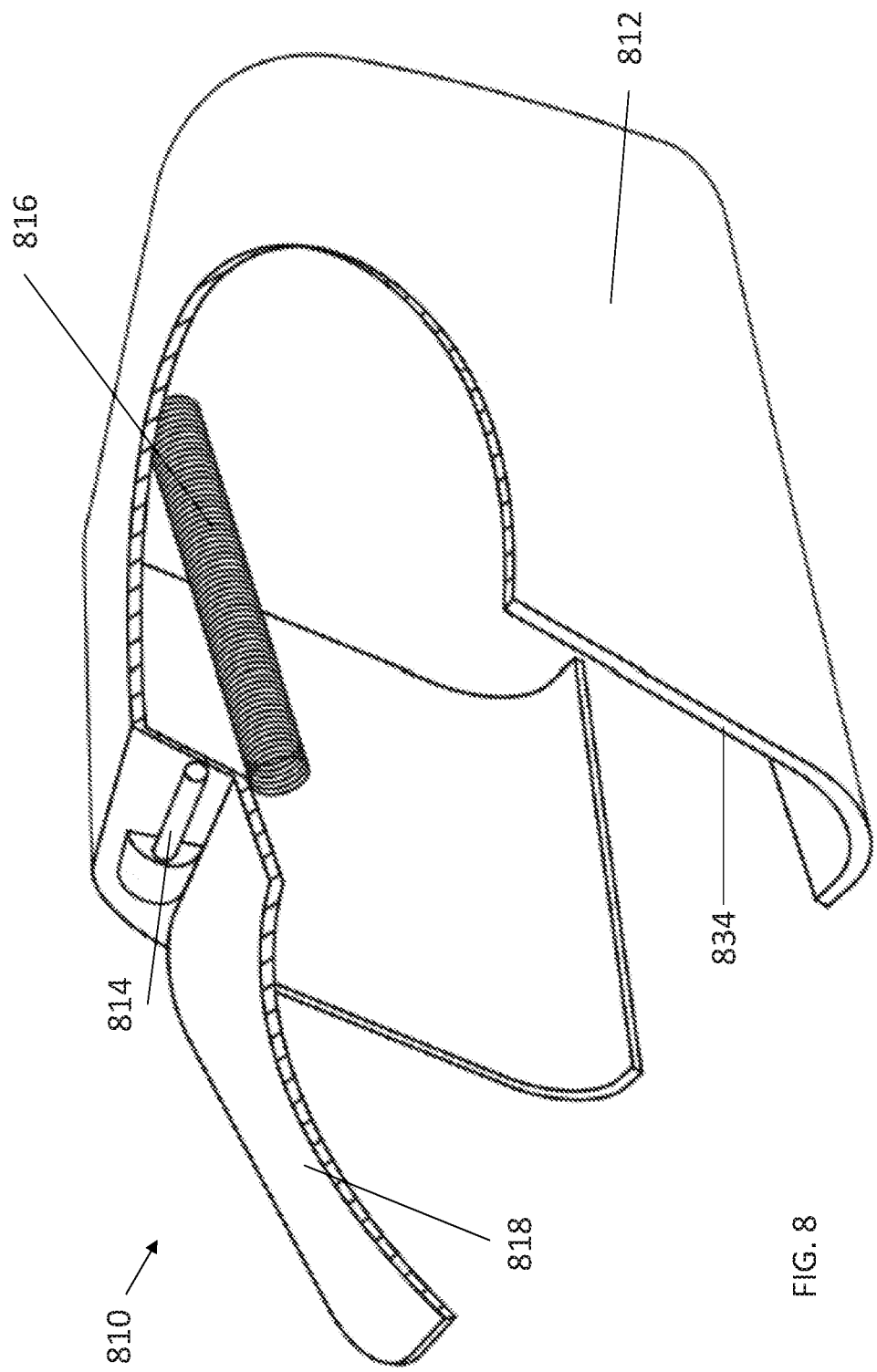
FIG. 8 is an example embodiment perspective view diagram of a check valve device, with a cutaway portion to show an internal spring.

FIG. 8 is an example embodiment perspective view diagram of a check valve device 810, with a cutaway portion to show an internal spring 816. Here, an upper internal surface of member body 812 can be coupled to a first end of spring 816. A second end of spring 816 can be coupled with valve member 818. As such, spring 816 is biased to hold valve member 818 in a closed position. When effluent flow comes through a downspout at backside 809 of device 810, it can push valve member 818 outward about pivot member 814, since spring 816 is designed to allow for outward flow through the device. Thus, spring 818 exerts a closure force on valve member 818 to augment closure of valve member 818, over the natural gravitation force that would otherwise be acting on it. As such, ingress of any vermin or unwanted pests through check valve body member 812 from the direction opposite effluent flow is normally blocked by the closed valve member 818, which in other embodiments described herein can be passively self-closing. Thus, spring 816 provides an active closure capability.

In some embodiments, a front side 834 of member body 812 can have the opposite angle from that shown. As such, valve member 818 can be pulled backward past a vertical hanging position that it would naturally take, such that its lower edge is located further back that hinge 814. As such, it may be biased in this orientation against the front edge of the body member (having a similar orientation) using spring 816 when closed, where, without spring 816 it would otherwise hang vertically due to gravity.

In various embodiments, body members can include lower side portions allowing check valves to bias against the inner walls of the downspout. Additional engagement between body members and downspouts can be facilitated though the addition of one or more projections or barbs located around the perimeter of body members or within an internal perimeter.

In some embodiments, adjacent sections of lower side portions of body member can be of a significantly larger diameter such that an external force is applied to the interior of the downspout. A number of hinge regions can be provided along the interior of check valve devices to ensure close matching between the exterior of body member of check valve device and the interior of the downspout. In addition, a number of barb projections can be engaged onto the interior of the downspout through said externally directed force. The barb projections can be feathered from the rear portion of body member at the exterior of body member to an end transition, and the abrupt disruption of the barb projection can allow it to engage with the interior of the downspout and resist extraction. The lower portion of body member can be left open to resist clogging of the downspout and to reduce sediment build up due to the lower edge of body member. During times of lower effluent flow rates the debris will settle out of the effluent and may build up in other embodiments.

Figure 9:
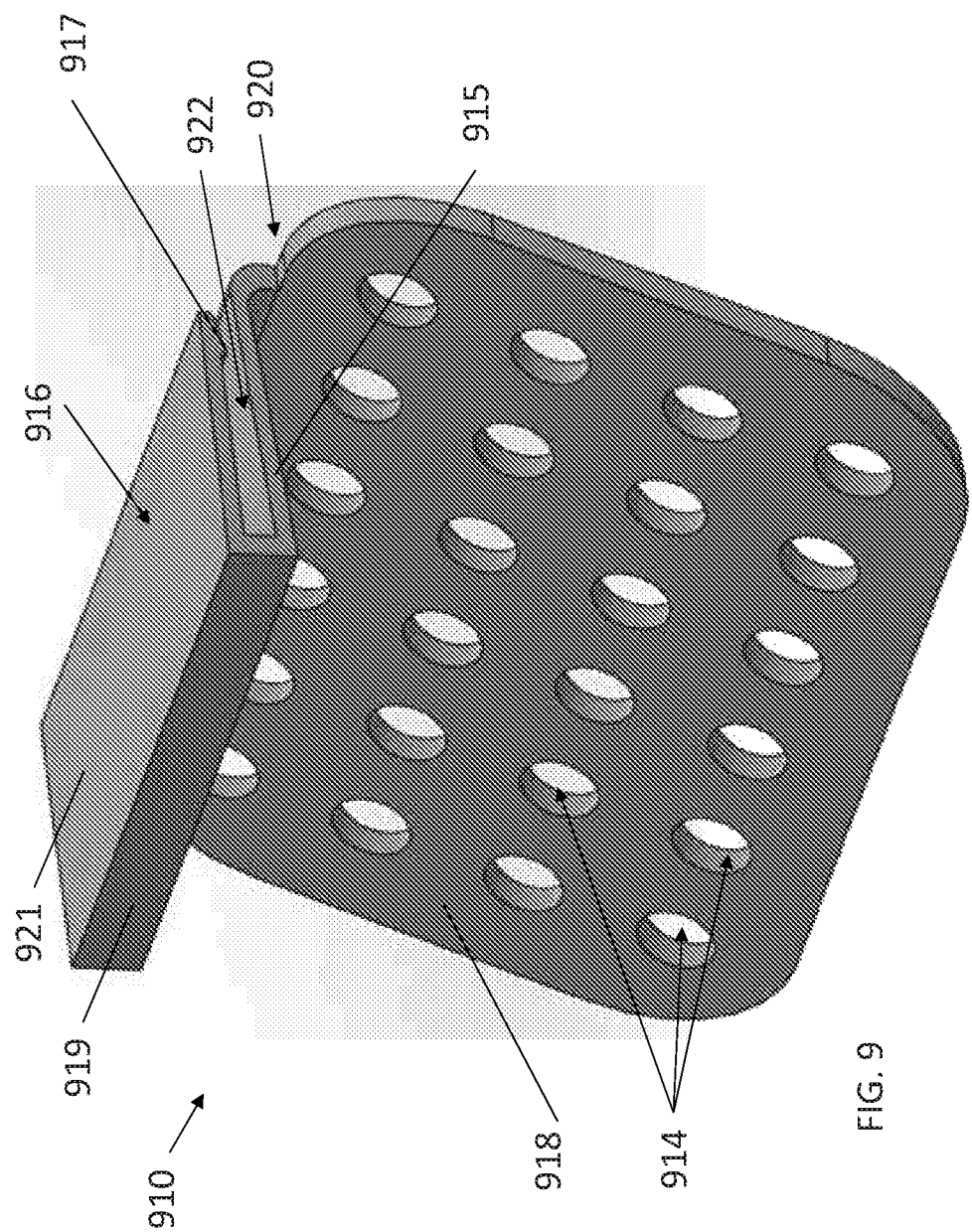
FIG. 9 is an example embodiment diagram of a check valve device including a valve member and coupling member.

FIG. 9 is an example embodiment diagram of a check valve device 910 including a valve member 918 and coupling member 916. In the example embodiment valve member 918 is part of a unitary or uniformly created structure with coupling member 916, while in other embodiments they can be removably or permanently coupled to each other from separate structures. As such, coupling member 916 can be coupled with valve member 918 at a hinge 920, which can be a living hinge. The unified structure can be coextruded such that the hinge 920 is a flexible hinge or can otherwise be permanently coupled with valve member 918. Thus, check valve device 910 can be self-supporting with the coupling member 916 operable to snap, secure, or otherwise fasten with an upper rim of a downspout. The hinge 920 can also have a narrower section along its length in order to allow for uni-directional movement for outward pushing effluent while preventing movement past a certain position in the opposite direction. In some embodiments, coupling member 916 can be described as a clip or clipping mechanism.

As shown, coupling member 916 can include a lower flat panel 915 and an upper panel 921, that are substantially parallel or slightly biased toward each other and coupled by a substantially vertical panel 919. As such, lower panel 915 and upper panel 921 create a space or channel 922 between them, which is sized to fit over and couple with a downspout upper edge. Upper panel 921 can have a lip or ridge 917 across a portion or across all of its underside. Lip or ridge 917 can be operable to fit within a complementary sized ridge of a downspout upper lip in some embodiments, or it can be operable to provide a tighter gripping section than would otherwise be provided by a flat underside of upper panel 921.

In some embodiments, coupling member 916 can be reinforced or further coupled with one or more combinations of screws, nails, bolts, washers, nuts, adhesives, or other fasteners, as known in the art or later developed. In some such embodiments, a user or installer can drill or otherwise create holes at predefined or predetermined locations through a downspout upper lip or wall. Then the user can proceed with coupling the check valve in place with the upper wall and aligning receiving holes in the coupling mechanism (not shown) with the hole or holes in the upper wall. Once aligned, the user can insert and fasten the fastener or fasteners in place.

As shown, valve member 918 can include one or more orifices 914 to allow for effluent flow through valve member 918. These orifices can be homogenously shaped holes, homogeneously sized holes, heterogeneously shaped holes, heterogeneously sized holes, or combinations thereof and can be located or fashioned in regular intervals in a regular pattern or irregular intervals and patterns. As such, in various embodiments this can be modified accordingly into irregular patterns, intervals, and different shapes and sizes of holes. As shown, several rows and columns of orifices 914 are regularly arranged and shaped with a circular cross section. Here, the overall size and arrangement of all orifices 914 is small, as compared to that of the solid portion of valve member 918, allowing for a lower amount of effluent flow than in some other embodiments described herein, for example in FIG. 7.

Figure 10A:
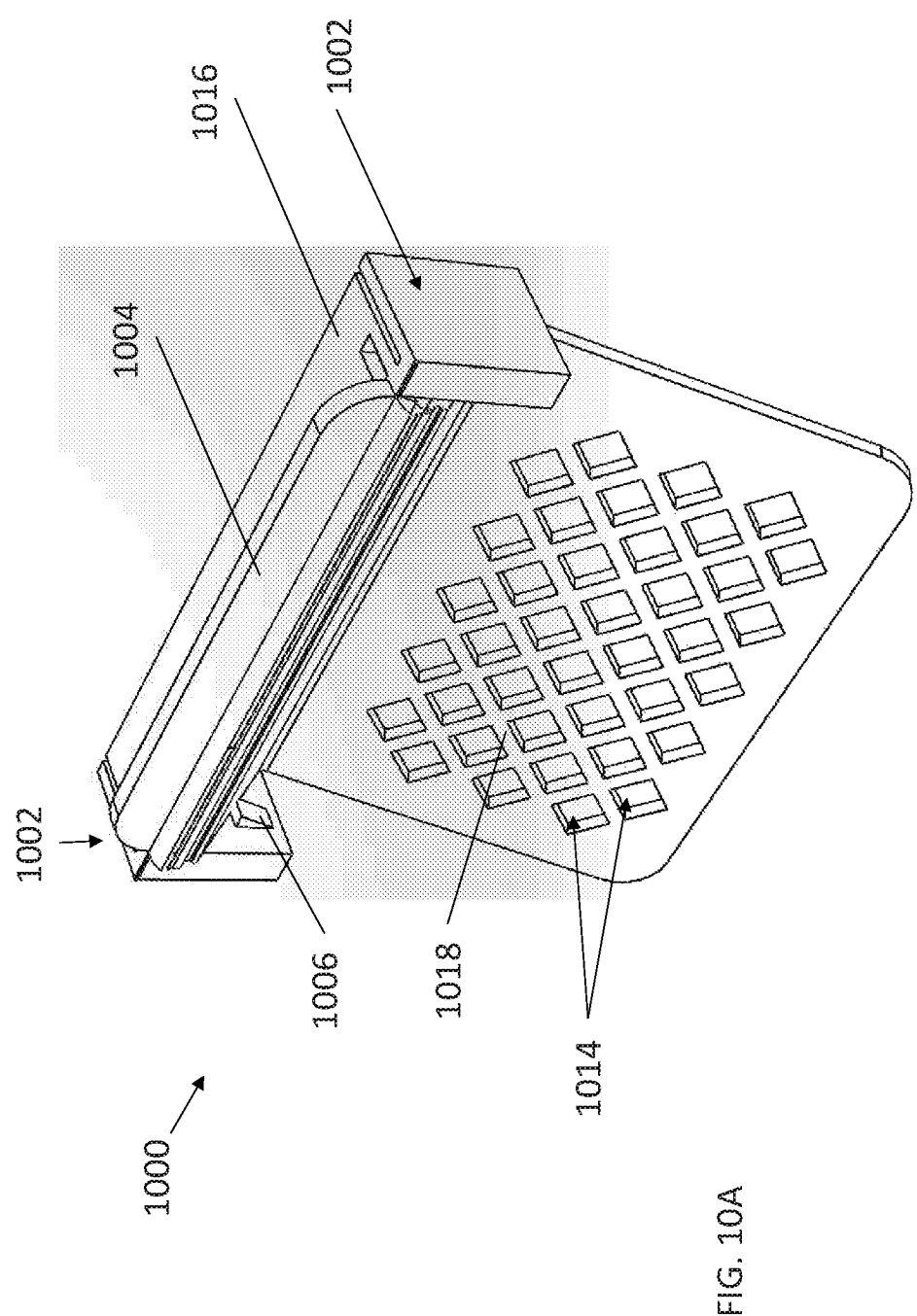
FIG. 10A is an example embodiment diagram of a check valve device including a valve member and coupling member in a folded or otherwise closed orientation.

FIG. 10A is an example embodiment diagram of a check valve device 1000 including a valve member 1018 and coupling member 1016 in a folded or otherwise closed orientation. In various embodiments, check valve devices can include side mountings, that are functional and operable to be mounted to a side wall of a downspout. As shown in the example embodiment, side mountings 1002 can be shaped and have similar appearance and function to a top mounting, as described with respect to coupling member 916 of FIG. 9. As such, it should be noted that similar description is applicable to side mountings 1002.

Side mountings 1002 can be coupled with or integrated structurally with a mounting body member 1016. As shown, mounting body member 1016 can be generally rectangular in cross sectional shape and can be located inside a downspout when installed. As such, it will generally be near or adjacent to the underside of an upper downspout wall. A front lip 1004 located on an upper surface of mounting body member 1016 can maintain an adequate and appropriate position for device 1000 overall, when installed, as its back edge can be flush with a front edge of an upper downspout wall. As shown, a valve member 1018 can be coupled with or integrated with mounting body member 1016 and hang below it in a standard position. One or more detents 1006 can be provided on an inner facing wall of side mountings 1002. In some embodiments, these allow for adjustment of device 1000, as will be described with respect to FIG. 10B. As shown, in some embodiments, detents 1006 can have a triangularly shaped cross section, in particular as a right triangle with a flat upper edge. In some embodiments, these can also be used to prevent valve member 1018 from being pushed too far or into an undesirable position.

Valve member 1018 can have one or more orifices 1014 that are diamond shaped in various embodiments. As such, these can be oriented vertically with each diamond's top and bottom points aligned in a vertical plane.

Figure 10B:
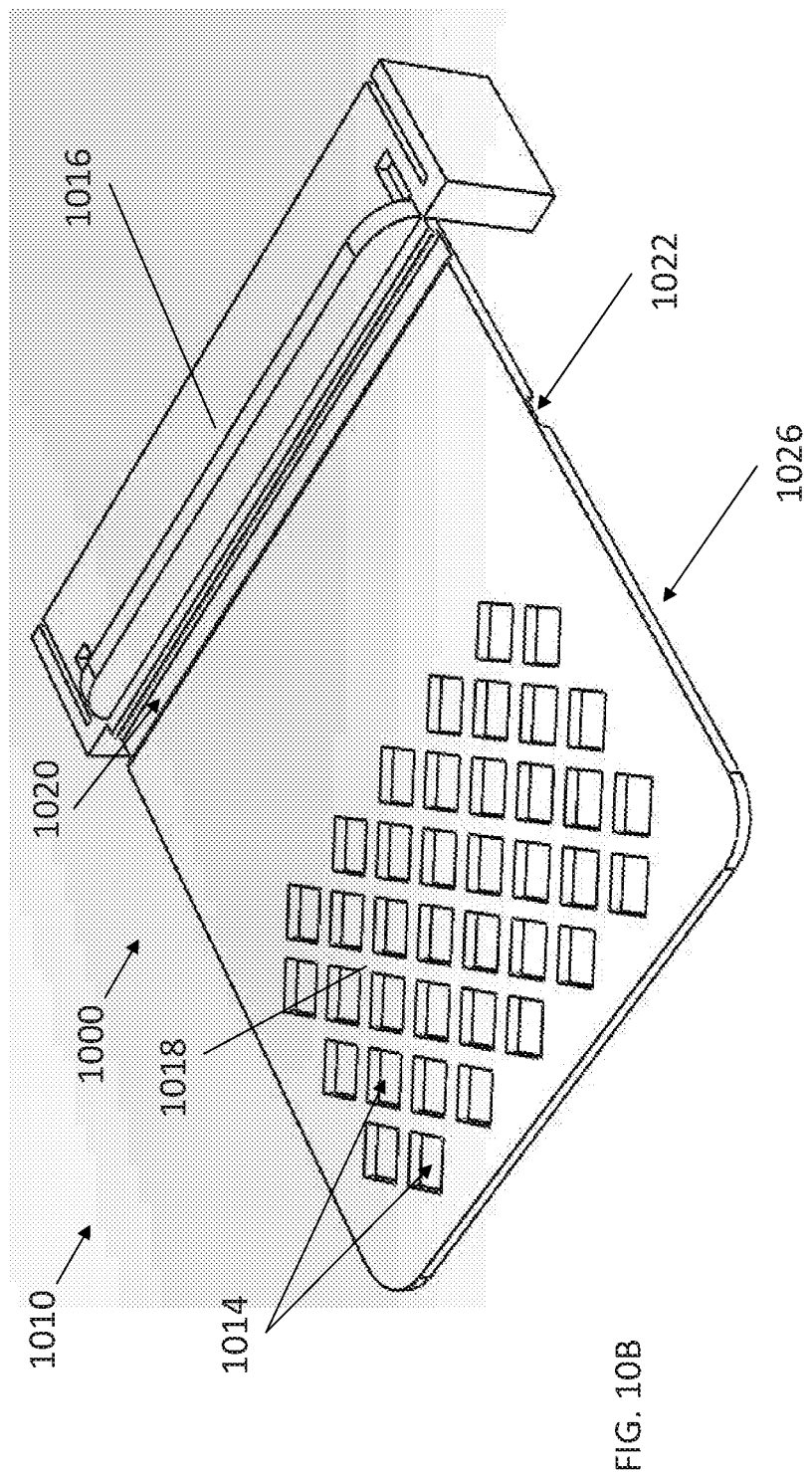
FIG. 10B is an example embodiment diagram of a check valve device including a valve member and coupling member in an unfolded or otherwise open orientation.

FIG. 10B is an example embodiment diagram 1010 of a check valve device 1000 including a valve member 1018 and coupling member 1016 in an unfolded or otherwise open orientation. As shown in the example embodiment, a first fold 1020 that faces outward and is located near lip 1004 can be oriented across the width of valve member 1018. First fold 1020 can be a living hinge that has a thin channel that is thinner than valve member 1018 and allows valve member 1018 to be folded partially or fully underneath a portion or all of mounting body member 1016 when folded. In some embodiments, this allows valve member 1018 to be folded and held in a desired position by a detent, e.g. detent 1006 of FIG. 10A.

Also shown in the example embodiment is a second fold 1022. Second fold 1022 can be shaped similarly to first fold 1020, but oriented in an opposite direction. This fold can allow a lower portion 1026 of valve member 1018 to swing freely when in a folded position, as shown in FIG. 10A. One advantage of the embodiments depicted in FIGS. 10A-10B is that they can allow a mold with an open and close, in other words with no side actions.

It should be noted that the various embodiments described herein can have components that are substituted, combined, removed, and otherwise modified to achieve the desired goals of blocking ingress to downspouts in one direction while allowing effluent flow outward in the other.

The check valve devices described herein can be constructed of many currently available or later developed materials. For example, portions or all parts of check valves described herein can be one or more types of known plastics, providing the advantages of ease of fabrication and low cost. Parts or all components of check valves can also be metal or wire. This can provide additional strength advantages. In some embodiments, check valves can be treated with external coatings to protect them from corrosion. In some embodiments, check valve devices can be treated with external coatings that deter pests from entering downspouts. Various other treatments and materials are also contemplated.

Check valves can be sold fully assembled or as a series or set of interchangeable components to permit assembly on-site and customization. This can be advantageous where, for example, the hinge mechanism consists of molded-in projections on valve members and molded detents in the body members. In such a hinge configuration, the valve member can be fitted to the body member as the check valve is inserted into the downspout, and the body member can generally conform to the geometry of the downspout. In this manner, and tendency of valve member and hinge mechanism to bind can be adjusted on site, for example, by simply removing excess material as desired. Also, where interchangeable components are provided, different valve members can be swapped out to provide optimal use during different seasons or in different locations. For example, large orifices or holes in valve members may be desirable during particularly rainy seasons, while smaller orifices or holes may be desirable where smaller pests are a concern.

Alternate embodiments of check valves can include valve members attached to body members by means of different types of hinge mechanisms. For example, some hinge mechanisms can include providing for valve members to pivot about an axle that is mounted to body member.

Valve members are generally depicted herein as quadrilaterals with rounded corners, but can assume any of numerous geometric shapes. However, it should be noted that valve members should generally be of sufficiently sized geometry to adequately cover an exit orifice of a coupled body member or to adequately cover the exit orifice of an effluent downspout.

Numerous embodiments of the check valve devices described herein can be affixed in place in the downspout through the use of fasteners that are screwed or otherwise fastened through the interior of body members into the interior of a downspout or through the exterior of the downspout into the exterior of body member. However, this and other methods of attachment or reinforced coupling of the check valves to downspouts can be equally applicable whether the check valve is configured to mount on the interior of the exterior of the downspouts.

Additional embodiments of the present check valve devices can include body members that are coupled or attached to valve members by a so called 'living hinge' or integral pivot hinge. The pivot hinge can be a point of a connection between a valve member and a body member that is established during the manufacturing process. Some embodiments include separate hinge components altogether, that can be individually coupled with valve members and valve bodies.

Figure 11:
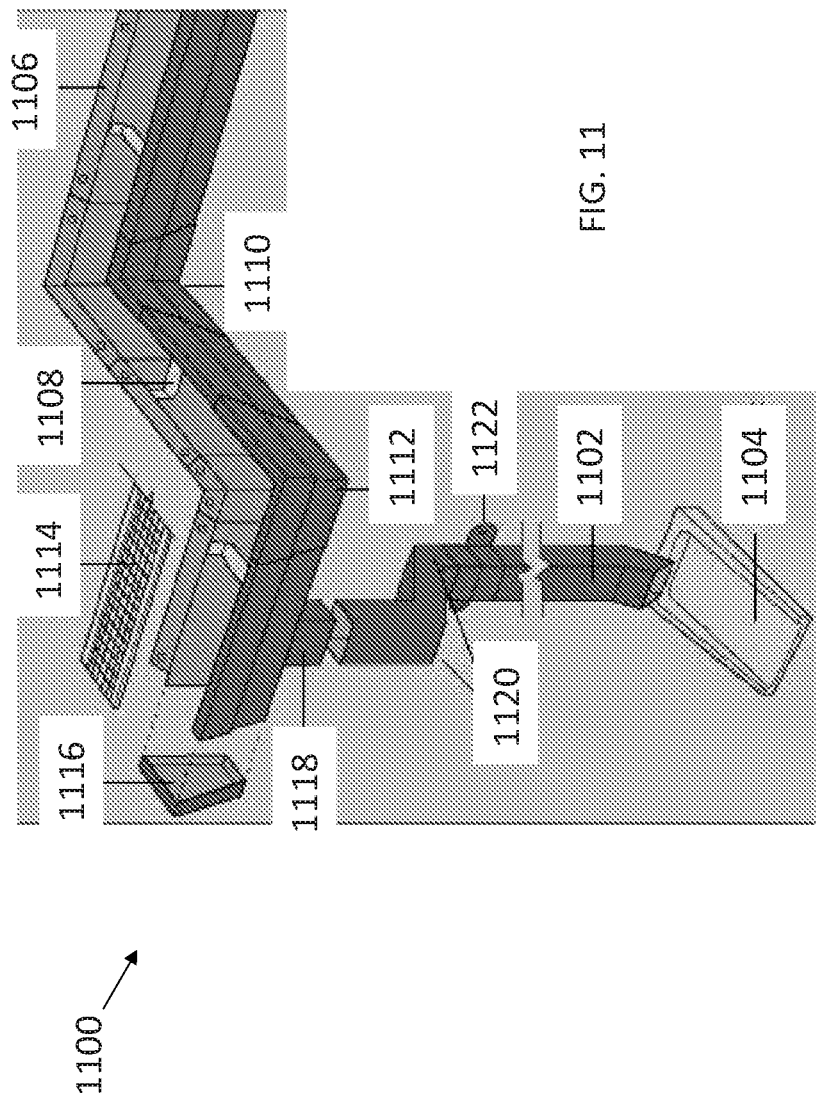
FIG. 11 shows an example embodiment diagram of a standard gutter system and downspout.

FIG. 11 shows an example embodiment diagram 1100 of a standard gutter system and downspout 1102. As shown in the example embodiment, a downspout 1102 can be a final egress location of water and debris caught in a gutter system before landing in a splash box 1104.

To elaborate, rain and debris from a roof can be caught in gutter sections 1106, which can have various other components including hangers 1108, inside corners 1110, outside corners 1112, leaf screens 1114, and end caps 1116. This water and debris can fall into a drop outlet 1118 and pass through various vertical sections that are joined by elbows 1120 and secured to a home by straps 1122 before exiting the system from downspout 1102.

Figure 12:
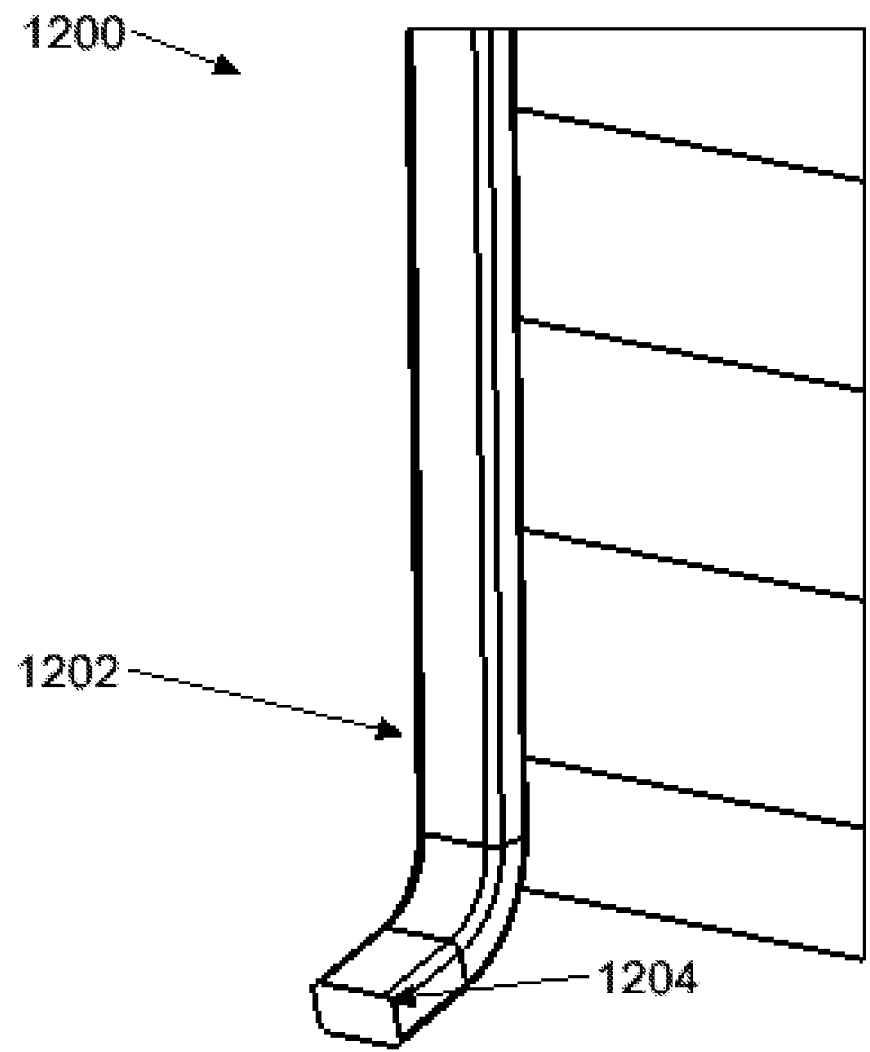
FIG. 12 shows an example image of a downspout attached to a residential home.

FIG. 12 shows an example image 1200 of a downspout 1202 attached to a residential home. As shown in the example embodiment, some downspouts have regular or irregularly shaped rectangular openings 1204. Although downspout 1202 shown is located slightly above ground level, often downspouts are located at ground level, allowing for easy entry for pests.

Figure 13:
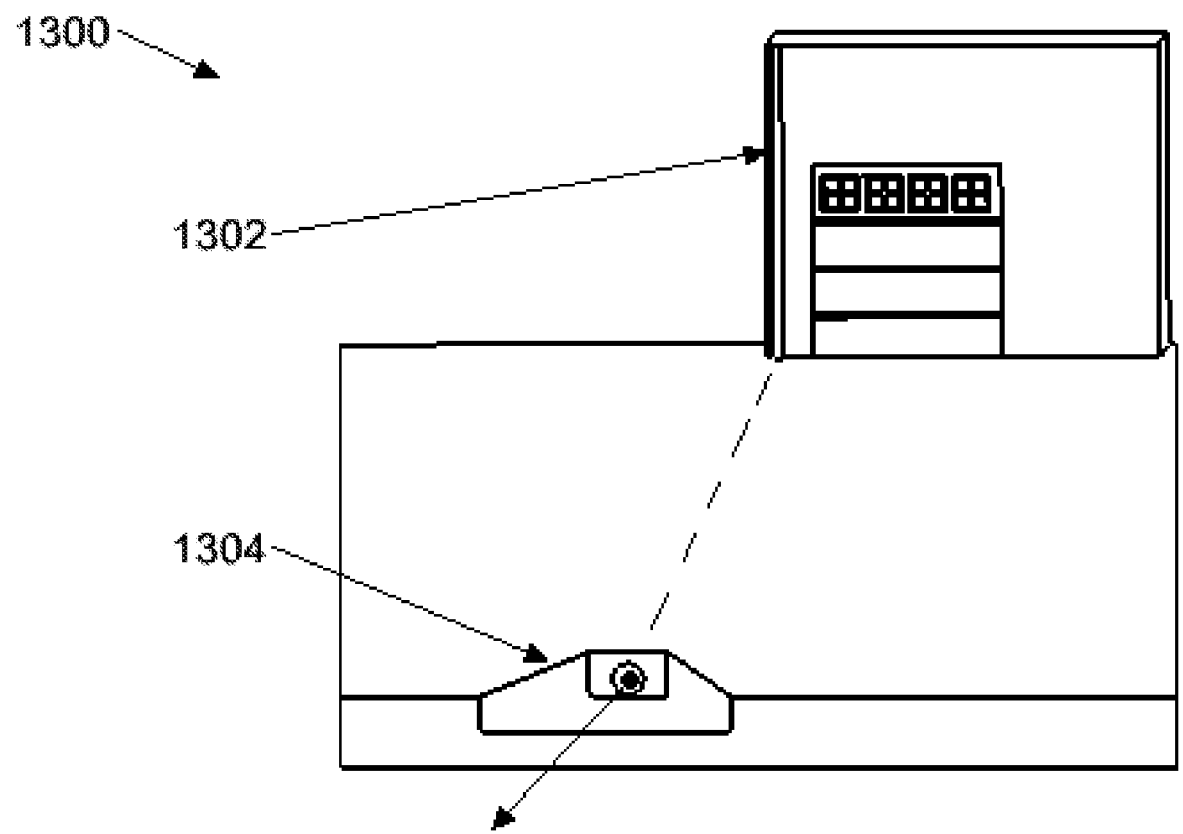
FIG. 13 shows an example embodiment image of a downspout that is coupled with a gutter system and permanently implanted underground away from a home.

FIG. 13 shows an example embodiment image 1300 of a downspout 1304 that is coupled with a gutter system and permanently implanted underground away from a home. As shown, vertical portions 1302 of the gutter system can be coupled with pipes or other underground installations, symbolized by the dashed line. These can end in a permanent downspout 1304 that allows egress of water and debris away from the home, near on in the street.

Figure 14:
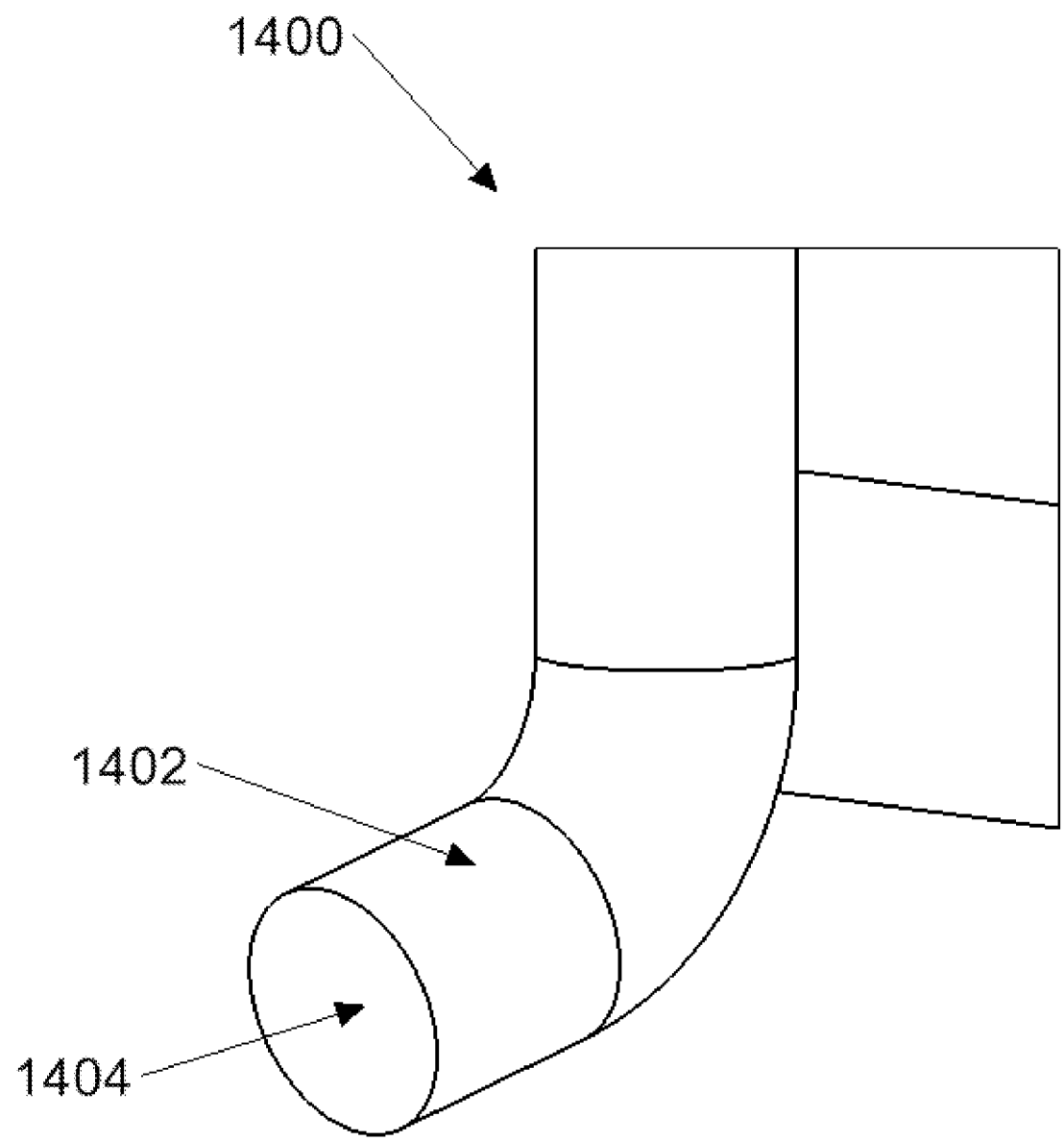
FIG. 14 shows an example embodiment image of a downspout draining water.

FIG. 14 shows an example embodiment image 1400 of a downspout 1402 draining water. As shown in the example embodiment, some downspouts 1402 can have circular or oval shaped openings.

Figure 15:
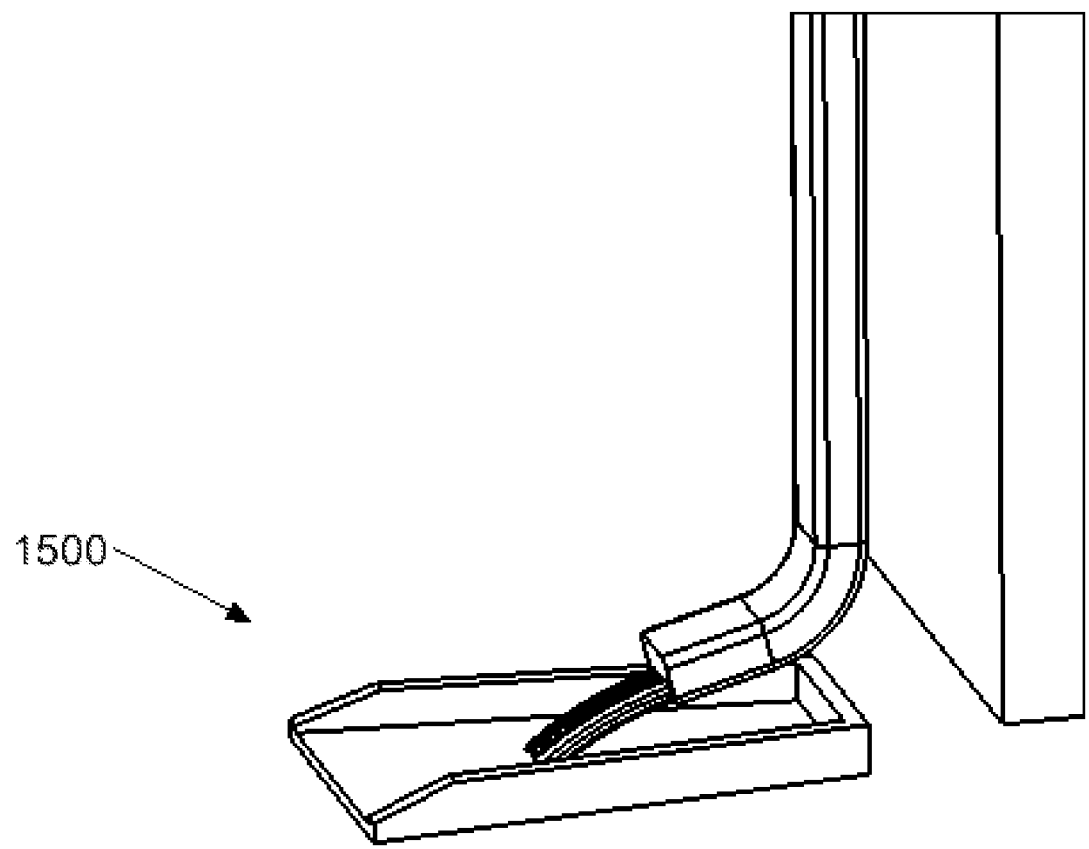
FIG. 15 shows an example embodiment image of a downspout draining water.

FIG. 15 shows an example embodiment image 1500 of a downspout draining water.

Figure 16:
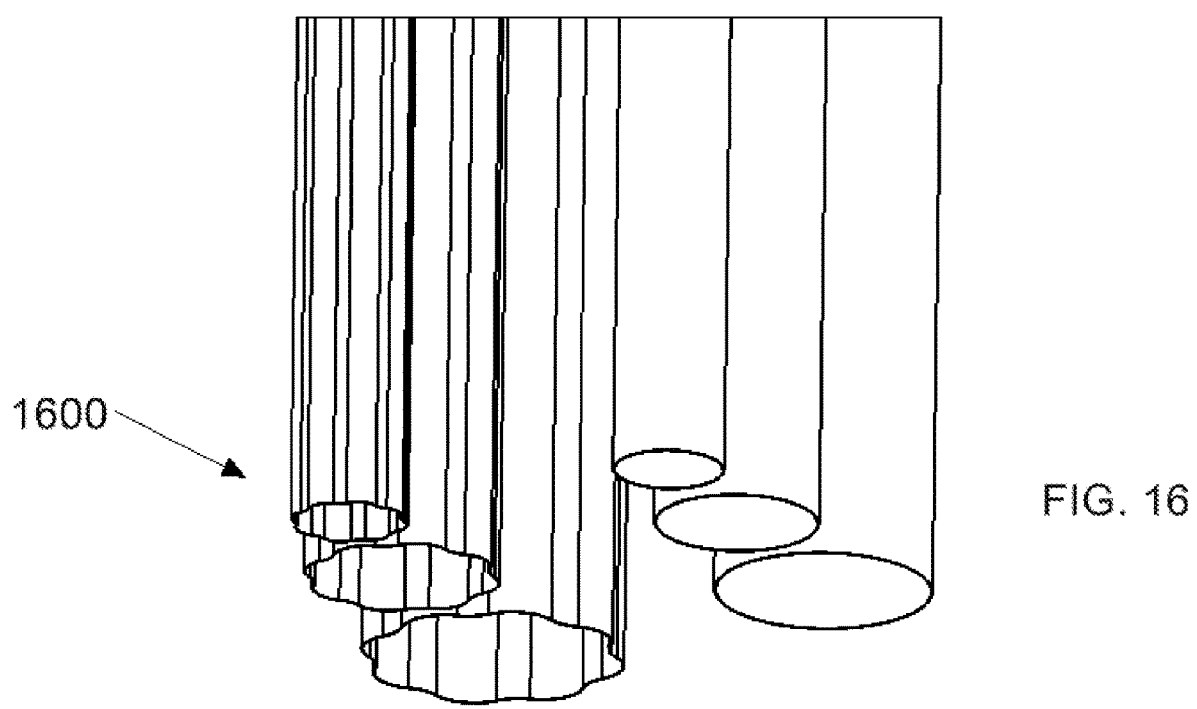
FIG. 16 shows an example embodiment image of a variety of downspout shapes.

FIG. 16 shows an example embodiment image 1600 of a variety of downspout opening shapes. As described herein, modifications to the check valve devices can allow them to be used for the purposes described herein.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed. Additionally, all publications discussed herein are hereby incorporated by reference in their entirety.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

The invention claimed is:

1. A system for blocking pests from entering a downspout opening and for allowing fluid flow outward, comprising:
a check valve, comprising:
a valve member; and
a coupling member,
wherein the coupling member is operable to be coupled with at least one wall of a downspout near the downspout opening,
wherein the coupling member is comprised of at least one clip which fastens to the rim of the downspout opening,
wherein the clip of the coupling member is comprised of at least one panel which contacts the inner wall of the downspout opening and one panel which contacts the outer wall of the downspout opening,
wherein the two panels are substantially parallel and joined together by a substantially perpendicular panel,
wherein the downspout is coupled to a gutter system attached to a structure,
wherein the valve member is coupled to the coupling member,
wherein the valve member is prevented from being pushed into the downspout opening past a particular orientation,
wherein the valve member prevents intrusion into the downspout opening and gutter system when it is prevented from being pushed into the downspout opening past a particular orientation, and
wherein the valve member is operable to pivot outward to allow fluid flow from within the downspout opening to escape.

2. The system of claim 1, wherein the valve member further comprises:
at least one solid valve body member; and
at least one orifice that is defined in part by a portion of the valve body member.

3. A check valve apparatus for deterring intrusion into a downspout opening and allowing fluid flow outward, comprising:
a coupling member, operable to couple to at least one wall of a downspout that defines the downspout opening,
wherein the coupling member is comprised of at least one clip which fastens to the rim of the downspout opening,
wherein the clip of the coupling member is comprised of at least one panel which contacts the inner wall of the downspout opening and one panel which contacts the outer wall of the downspout opening,
wherein the two panels are substantially parallel and joined together by a substantially perpendicular panel,
wherein the downspout is coupled to a gutter system attached to a structure; and
a valve member, pivotably coupled to the coupling member,
wherein the valve member is operable to at least partially block intrusion into the downspout opening in a closed position and to allow fluid flow outward from the downspout in an open position.

4. The check valve apparatus of claim 3, further comprising:
at least one closure component that actively facilitates closure of the valve member with respect to the downspout.

5. The check valve apparatus of claim 4, wherein the closure component is a spring that is coupled at one end to the coupling member and at another end with the valve member.

6. The check valve apparatus of claim 3, wherein the valve member is pivotably coupled to the coupling member by a hinge.

7. The check valve apparatus of claim 6, wherein the hinge is a living hinge.

8. The check valve apparatus of claim 3, wherein the valve member further comprises:

a solid panel.

9. The check valve apparatus of claim 8, wherein the solid panel further comprises:
an orifice that allows fluid flow through the panel.

10. The check valve apparatus of claim 8, wherein the solid panel further comprises:
a plurality of orifices that allow fluid flow through the panel.

11. The check valve apparatus of claim 10, wherein the plurality of orifices are arranged in a regular pattern.

12. The check valve apparatus of claim 3, wherein the valve member further comprises:
a grate comprised of a plurality of bars that define orifices therebetween.

\* \* \* \* \*